US012150031B2

(12) United States Patent
Elshafie et al.

(10) Patent No.: US 12,150,031 B2
(45) Date of Patent: Nov. 19, 2024

(54) REFERENCE-SIGNAL-BASED RELAY SELECTION IN WIRELESS COMMUNICATIONS

(71) Applicant: QUALCOMM Incorporated, San Diego, CA (US)

(72) Inventors: Ahmed Elshafie, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 17/484,802

(22) Filed: Sep. 24, 2021

(65) Prior Publication Data

US 2023/0096726 A1 Mar. 30, 2023

(51) Int. Cl.
*H04W 40/22* (2009.01)
*H04W 40/12* (2009.01)
*H04W 40/20* (2009.01)
*H04W 40/28* (2009.01)

(52) U.S. Cl.
CPC ........... *H04W 40/22* (2013.01); *H04W 40/12* (2013.01); *H04W 40/20* (2013.01); *H04W 40/28* (2013.01)

(58) Field of Classification Search
CPC ..... H04W 40/22; H04W 40/12; H04W 40/20; H04W 40/28; H04W 40/246; H04L 43/0882; H04L 5/0048; H04L 41/046
See application file for complete search history.

(56) References Cited

U.S. PATENT DOCUMENTS 9,673,885 B2 * 6/2017 Bodas ................. H04W 40/246
2016/0192439 A1 * 6/2016 Phuyal ...................... H04L 1/08
370/315
2018/0035437 A1 * 2/2018 Kahtava ............ H04B 7/15528
(Continued)

FOREIGN PATENT DOCUMENTS

CN 103561447 A * 2/2014
CN 105050155 B * 4/2018
(Continued)

OTHER PUBLICATIONS

International Search Report and Written Opinion—PCT/US2022/044279—ISA/EPO—Dec. 22, 2022 (2103902WO).

*Primary Examiner* — Ayaz R Sheikh
*Assistant Examiner* — Louis Samara
(74) *Attorney, Agent, or Firm* — Paul M. Mcadams; Holland & Hart LLP

(57) ABSTRACT

Methods, systems, and devices for relay path selection in wireless communications are described, where multiple relay paths are available between a source and a destination. A first node (e.g., a source node or destination node) may determine reference signal resources for a set of reference signals to be transmitted between the first node and a second node through a corresponding relay path of a set of relay paths. The first node may receive the set of reference signals measure one or more parameters for each reference signal. Alternatively, the first node may transmit the set of reference signals and receive an indication of one or more measured parameters from the second node. The first node may determine a set of end-to-end metrics for the set of relay paths, and select a relay path for communications with the second node based on the set of end-to-end metrics.

30 Claims, 19 Drawing Sheets

(56) References Cited

U.S. PATENT DOCUMENTS

| | | | | |
|---|---|---|---|---|
| 2021/0112479 A1* | 4/2021 | Abedini | ................ | H04W 40/12 |
| 2022/0322203 A1* | 10/2022 | Wang | .................... | H04W 40/22 |
| 2022/0345983 A1* | 10/2022 | Takeda | .................. | H04W 40/22 |
| 2023/0096726 A1* | 3/2023 | Elshafie | .............. | H04W 40/246 |
| | | | | 370/329 |

FOREIGN PATENT DOCUMENTS

| | | | |
|---|---|---|---|
| JP | 2006237960 A * | 9/2006 | |
| JP | 2010109915 A * | 5/2010 | |
| KR | 101303901 B1 * | 9/2013 | |
| WO | WO-2016172360 A1 * | 10/2016 | |
| WO | WO-2018092748 A1 * | 5/2018 | ........... H04L 41/046 |
| WO | WO-2023161431 A1 * | 8/2023 | |

* cited by examiner

REFERENCE-SIGNAL-BASED RELAY SELECTION IN WIRELESS COMMUNICATIONS

FIELD OF TECHNOLOGY

The following relates to wireless communications, including reference-signal-based relay selection in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support both access link and sidelink communications between devices. An access link refers to a communication link between a UE and a network node (e.g., a base station), and in some cases may be referred to as a Uu interface. Specifically, the Uu interface may refer to an over-the-air interface for downlink transmissions, uplink transmissions, or both. A sidelink refers to a communication link between similar devices (e.g., between multiple UEs) and in some cases may be referred to as a PC5 interface. For example, a sidelink may support communications between multiple UEs (e.g., in a vehicle-to-everything (V2X) system, a vehicle-to-vehicle (V2V) system, a device-to-device (D2D) system, nodes in an integrated access and backhaul (IAB) network, among other examples). Efficient and reliable techniques for managing various access link communications and sidelink communications may enhance network efficiency and reliability.

SUMMARY

The described techniques relate to improved methods, systems, devices, and apparatuses that support reference-signal-based relay selection in wireless communications. In various aspects, techniques are described for path selection between a source node (e.g., a user equipment (UE) or a base station, or some other type of wireless node) and a destination node (e.g., a UE or a base station), where at least some available paths include one or more relay nodes between the source node and the destination node. In some cases, a first node (e.g., a source node or destination node) may determine reference signal resources for a set of reference signals to be transmitted between the first node and a second node through corresponding relay paths of a first subset of a set of relay paths. In some cases, the first node may receive the set of reference signals and measure one or more parameters for each reference signal. In other cases, the first node may transmit the set of reference signals using the reference signal resources, and receive an indication of one or more measured parameters from the second node. The first node may, based at least in part on the measured parameters, may determine a set of end-to-end metrics for the set of relay paths, and select a relay path for communications with the second node based at least in part on the set of end-to-end metrics.

A method for wireless communication at a first node is described. The method may include determining reference signal resources for a set of multiple reference signals to be transmitted between the first node and a second node through a corresponding relay path of a first subset of a set of relay paths, where each relay path of the first subset of relay paths includes a relay node of a set of relay nodes that relay transmissions between the first node and the second node, obtaining measurement information for each of the set of multiple reference signals, determining, based on the measurement information, a set of end-to-end metrics for the set of relay paths between the first node and the second node, each relay path having one or more relay nodes of the set of relay nodes, selecting a first relay path based on the set of end-to-end metrics, and transmitting an indication of the first relay path to the second node.

An apparatus for wireless communication at a first node is described. The apparatus may include a processor, memory coupled with the processor, and instructions stored in the memory. The instructions may be executable by the processor to cause the apparatus to determine reference signal resources for a set of multiple reference signals to be transmitted between the first node and a second node through a corresponding relay path of a first subset of a set of relay paths, where each relay path of the first subset of relay paths includes a relay node of a set of relay nodes that relay transmissions between the first node and the second node, obtain measurement information for each of the set of multiple reference signals, determine, based on the measurement information, a set of end-to-end metrics for the set of relay paths between the first node and the second node, each relay path having one or more relay nodes of the set of relay nodes, select a first relay path based on the set of end-to-end metrics, and transmit an indication of the first relay path to the second node.

Another apparatus for wireless communication at a first node is described. The apparatus may include means for determining reference signal resources for a set of multiple reference signals to be transmitted between the first node and a second node through a corresponding relay path of a first subset of a set of relay paths, where each relay path of the first subset of relay paths includes a relay node of a set of relay nodes that relay transmissions between the first node and the second node, means for obtaining measurement information for each of the set of multiple reference signals, means for determining, based on the measurement information, a set of end-to-end metrics for the set of relay paths between the first node and the second node, each relay path having one or more relay nodes of the set of relay nodes, means for selecting a first relay path based on the set of end-to-end metrics, and means for transmitting an indication of the first relay path to the second node.

A non-transitory computer-readable medium storing code for wireless communication at a first node is described. The code may include instructions executable by a processor to determine reference signal resources for a set of multiple reference signals to be transmitted between the first node and a second node through a corresponding relay path of a first subset of a set of relay paths, where each relay path of the first subset of a set of relay paths includes a relay node of a set of relay nodes that relay transmissions between the first node and the second node, obtain measurement information for each of the set of multiple reference signals, determine, based on the measurement information, a set of end-to-end metrics for the set of relay paths between the first node and the second node, each relay path having one or more relay nodes of the set of relay nodes, select a first relay path based on the set of end-to-end metrics, and transmit an indication of the first relay path to the second node.

In some examples of the method, apparatuses, and non-transitory computer-readable medium described herein, the reference signal resources include resources for one reference signal transmission for each relay node of the set of relay nodes. Some examples of the method, apparatuses, and non-transitory computer-readable medium described herein may further include operations, features, means, or instructions for identifying a reference signal combiner codebook that indicates a first subset of the set of end-to-end metrics that each have a corresponding direct measurement based on a dedicated reference signal for respective relay paths of a first subset of relay paths, and that indicates a second subset of the set of end-to-end metrics that are derived from one or more combinations of end-to-end metrics of the first subset of end-to-end metrics, the second subset of end-to-end metrics associated with a second subset of relay paths that is different than the first subset of relay paths and where the set of end-to-end metrics is determined based on the reference signal combiner codebook.

Some examples of the method, apparatuses, and non-transitory computer-readable medium described herein may further include operations, features, means, or instructions for transmitting the set of multiple reference signals to the second node through the set of relay nodes and where the obtaining the measurement information includes receiving, from the second node, the measurement information for each of the set of multiple reference signals. In some examples of the method, apparatuses, and non-transitory computer-readable medium described herein, the obtaining the measurement information may include operations, features, means, or instructions for measuring each reference signal of the set of multiple reference signals. In some examples of the method, apparatuses, and non-transitory computer-readable medium described herein, the first node may be a source node that transmits information to the second node via one or more relay nodes of the set of relay nodes using the first relay path, or the first node may be a destination node that receives information from the second node via one or more relay nodes of the set of relay nodes using the first relay path.

In some examples of the method, apparatuses, and non-transitory computer-readable medium described herein, each relay node of the set of relay nodes performs amplify-and-forward (AF) relaying between the first node and the second node, and where the transmitted reference signal may be AF relayed by each relay node. Some examples of the method, apparatuses, and non-transitory computer-readable medium described herein may further include operations, features, means, or instructions for transmitting the set of multiple reference signals to the second node via the set of relay nodes and receiving, from the second node, a set of combiner indicator vectors that indicate potential relay paths, where the measurement information is obtained from the set of combiner indicator vectors. In some examples of the method, apparatuses, and non-transitory computer-readable medium described herein, the set of combiner indicator vectors indicates one or more end-to-end metrics for candidate relay paths of the set of relay paths having associated end-to-end metrics that support forwarding of transport blocks (TBs) from the first node to the second node.

Some examples of the method, apparatuses, and non-transitory computer-readable medium described herein may further include operations, features, means, or instructions for receiving the set of multiple reference signals from the second node via the set of relay nodes, and where the obtaining the measurement information includes measuring one or more parameters of the received reference signals and reserving channel resources of the first relay path for packet relaying of packets transmitted by the second node to the first node. Some examples of the method, apparatuses, and non-transitory computer-readable medium described herein may further include operations, features, means, or instructions for transmitting a second set of multiple reference signals to the second node via the set of relay nodes and receiving, from the second node, a second indication of a second relay path for relaying transport blocks from the first node to the second node.

In some examples of the method, apparatuses, and non-transitory computer-readable medium described herein, each relay node of the set of relay nodes performs analog amplify-and-forward (AF) relaying between the first node and the second node, and where the transmitted reference signals that are relayed include an identification of a source of the corresponding reference signal.

In some examples of the method, apparatuses, and non-transitory computer-readable medium described herein, each relay node of the set of relay nodes performs analog amplify-and-forward (AF) relaying between the first node and the second node, and where a source of each reference signal may be identified based on wireless resources used to transmit the reference signal, a starting time of the reference signal, or any combinations thereof. In some examples of the method, apparatuses, and non-transitory computer-readable medium described herein, each relay node of the set of relay nodes performs decode-and-forward (DF) relaying between the first node and the second node, and where each relay node quantizes and reports a reference signal measurement parameter of a received reference signal of the set of multiple reference signals, and transmits an associated reference signal of the set of multiple reference signals, and where and the determining is based on the reference signal measurement parameters from the set of relay nodes and one or more measurements of the reference signals transmitted by the relay nodes. In some examples of the method, apparatuses, and non-transitory computer-readable medium described herein, the obtaining includes computing a channel metric of each reference signal from the set of relay nodes, and where the method further includes generating, based on the channel metric of each reference signal and the reference signal measurement parameters, a reference signal combiner indicator vector that indicates one or more combinations of relay nodes that are candidates for selection as the first relay path.

A method for wireless communication is described. The method may include determining, at a second node, reference signal resources for a set of multiple reference signals to be transmitted between a first node and the second node through a corresponding relay path of a first subset of a set of relay paths, where each relay path of the first subset of relay paths includes a relay node of a set of relay nodes that relay transmissions between the first node and the second node, transmitting, to the first node, one or more of the set of multiple reference signals via the set of relay nodes, or a set of end-to-end metrics that are based on one more measurements of the set of multiple reference signals that are received at the second node, and receiving, form the first node, an indication of a first relay path of the set of relay paths to be used for relayed communication between the first node and the second node.

An apparatus for wireless communication is described. The apparatus may include a processor, memory coupled with the processor, and instructions stored in the memory. The instructions may be executable by the processor to cause the apparatus to determine, at a second node, reference signal resources for a set of multiple reference signals to be transmitted between a first node and the second node through a corresponding relay path of a first subset of a set of relay paths, where each relay path of the first subset of relay paths includes a relay node of a set of relay nodes that relay transmissions between the first node and the second node, transmit, to the first node, one or more of the set of multiple reference signals via the set of relay nodes, or a set of end-to-end metrics that are based on one more measurements of the set of multiple reference signals that are received at the second node, and receive, form the first node, an indication of a first relay path of the set of relay paths to be used for relayed communication between the first node and the second node.

Another apparatus for wireless communication is described. The apparatus may include means for determining, at a second node, reference signal resources for a set of multiple reference signals to be transmitted between a first node and the second node through a corresponding relay path of a first subset of a set of relay paths, where each relay path of the first subset of relay paths includes a relay node of a set of relay nodes that relay transmissions between the first node and the second node, means for transmitting, to the first node, one or more of the set of multiple reference signals via the set of relay nodes, or a set of end-to-end metrics that are based on one more measurements of the set of multiple reference signals that are received at the second node, and means for receiving, form the first node, an indication of a first relay path of the set of relay paths to be used for relayed communication between the first node and the second node.

A non-transitory computer-readable medium storing code for wireless communication is described. The code may include instructions executable by a processor to determine, at a second node, reference signal resources for a set of multiple reference signals to be transmitted between a first node and the second node through a corresponding relay path of a first subset of a set of relay paths, where each relay path of the first subset of relay paths includes a relay node of a set of relay nodes that relay transmissions between the first node and the second node, transmit, to the first node, one or more of the set of multiple reference signals via the set of relay nodes, or a set of end-to-end metrics that are based on one more measurements of the set of multiple reference signals that are received at the second node, and receive, form the first node, an indication of a first relay path of the set of relay paths to be used for relayed communication between the first node and the second node.

In some examples of the method, apparatuses, and non-transitory computer-readable medium described herein, the reference signal resources include resources for one reference signal transmission for each relay node of the set of relay nodes. Some examples of the method, apparatuses, and non-transitory computer-readable medium described herein may further include operations, features, means, or instructions for identifying a reference signal combiner codebook that indicates a first subset of the set of end-to-end metrics that each have a corresponding direct measurement based on a dedicated reference signal for respective relay paths of a first subset of relay paths, and that indicates a second subset of the set of end-to-end metrics that are derived from one or more combinations of end-to-end metrics of the first subset of end-to-end metrics, the second subset of end-to-end metrics associated with a second subset of relay paths that is different than the first subset of relay paths and where the set of end-to-end metrics are determined based on the reference signal combiner codebook.

Some examples of the method, apparatuses, and non-transitory computer-readable medium described herein may further include operations, features, means, or instructions for receiving the set of multiple reference signals from the first node via the set of relay nodes and measuring one or more reference signal parameters of each of the set of multiple reference signals, and where the set of end-to-end metrics is determined based on the one or more reference signal parameters. In some examples of the method, apparatuses, and non-transitory computer-readable medium described herein, the set of multiple reference signals may be transmitted by the second node and the method, apparatuses, and non-transitory computer-readable medium may include further operations, features, means, or instructions for receiving, from the first node, a set of reference signal combiner indicator vectors that indicate one or more end-to-end metrics for candidate relay paths of the set of relay paths having associated end-to-end metrics that support forwarding of TBs from the first node to the second node.

In some examples of the method, apparatuses, and non-transitory computer-readable medium described herein, each relay node of the set of relay nodes performs AF relaying between the first node and the second node, and where the transmitted reference signals are AF relayed by each relay node. In some examples of the method, apparatuses, and non-transitory computer-readable medium described herein, each relay node of the set of relay nodes performs DF relaying between the first node and the second node, and where each relay node quantizes and reports a reference signal measurement parameter of a received reference signal of the set of multiple reference signals, and transmits an associated reference signal of the set of multiple reference signals, and where and the set of end-to-end channel metrics are determined based on the reference signal measurement parameters from the set of relay nodes and one or more measurements of the reference signals transmitted by the relay nodes.

DETAILED DESCRIPTION

Figure 1:
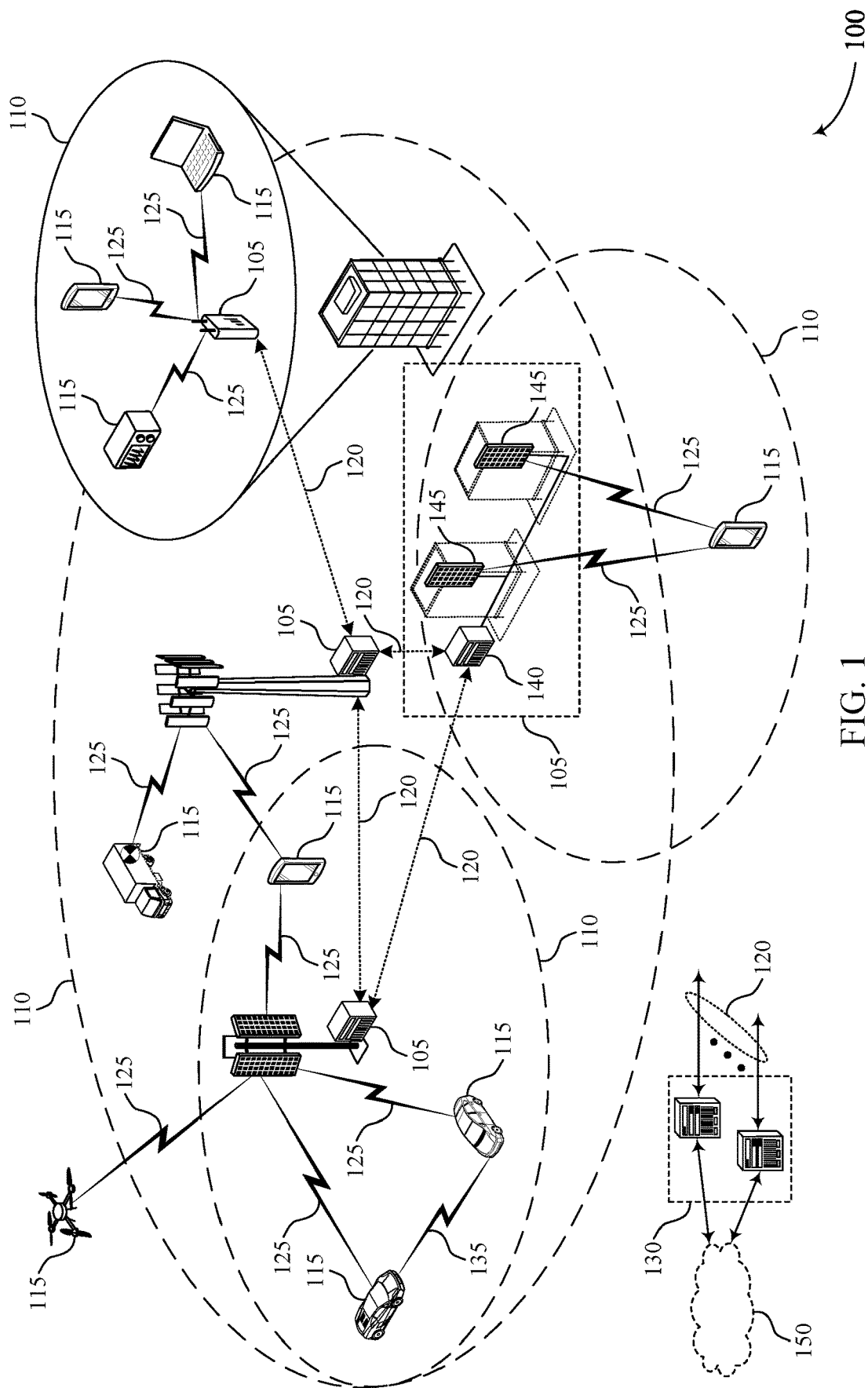
FIG. 1 illustrates an example of a wireless communications system that supports reference-signal-based relay selection in wireless communications in accordance with aspects of the present disclosure.

Some wireless communications systems, such as fifth generation (5G) systems, which may be referred to as New Radio (NR) systems, may support both access link and sidelink communications between devices. An access link (e.g., a Uu interface) may refer to a communication link between a network node (e.g., a base station) and a user equipment (UE). A sidelink (e.g., a PC5 interface) may refer to a communication link between user, relay, or end devices (e.g., a communication link between UEs). In some cases, wireless nodes (e.g., UEs, base stations, or both) may experience relatively rapid changes to channel conditions that may negatively impact communications between a transmitting device (e.g., a source node) and a desired receiving device (e.g., a destination node). For example, in vehicle-to-everything (V2X) communications the presence of one or more vehicles in proximity to a source UE may result in a blockage or interference in communications between the source UE and a destination UE. Similar situations may arise in other scenarios, such as in factory automation where blocking or interference may occur relatively frequently.

In order to mitigate communications gaps in such scenarios, relay schemes may allow a source node to use one or more relay nodes to relay a communication from the source node to the destination node. It is noted that while various examples provided herein are discussed for UE sidelink devices, such sidelink techniques may be used for any type of wireless devices that use sidelink communications. For example, a sidelink may support device-to-device (D2D) communications, V2X or vehicle-to-vehicle (V2V) communications, message relaying, discovery signaling, beacon signaling, integrated access and backhaul (IAB) communications, or any combination of these or other signals transmitted over-the-air between devices. Further, various examples provided herein discuss relays, relay nodes, and relay paths, and a relay or relay node refers to any node (e.g., wireless device) that receives a communication from one node and sends the communication to another node using any available technique, and a relay path refers to the resulting communications path between two nodes via a relay.

Relay techniques may enhance the reliability of communications, but consume network resources, and thus efficient techniques are desired for implementing relayed communications. In some cases, multiple different relay nodes may be available, and multiple hops across two or more relay nodes may be used. In such cases, a number of different relay paths may be available to complete a communication between the transmitting source node to the receiving destination node. Various aspects of the present disclosure provide techniques for selection of a path from multiple different possible relay paths of a set of available relay paths. In some cases, reference signal resources may be configured for each relay of a number of potential relays between a source node and destination node. A first node (e.g., the source node or destination node) may transmit reference signals for each of the reference signal resources. These reference signals are then relayed via the number of potential relays, and a second node (e.g., the destination node or the source node) may measure each relayed reference signal. The measurements at the second node may be used to determine end-to-end metrics for the set of available relay paths, which may be used to select a relay path. In some cases, the node that evaluates the metrics and selects the relay path may be the source node. In other cases, the node that evaluates the metrics and selects the relay path may be the destination node or a different node (e.g., a network node or a base station). In some cases, a reference signal combiner codebook may be used to combine reference signal metrics from multiple relays and derive channel metrics for other combinations of relays (e.g., for relay paths that use joint transmissions across two or more relays using the same time/frequency resources, for relay paths that use multiple hops, or any combinations thereof). Various described techniques may be used in amplify-and-forward (AF) relaying, as well as decode-and-forward (DF) relaying. If DF relaying is used, a relay node may receive a reference signal from a first node and determine one or more associated metrics (e.g., a reference signal received power (RSRP), reference signal received quality (RSRQ), signal to noise ratio (SNR), signal to interference and noise ratio (SINR), etc.) and transmit its own reference signal along with the one or more channel metrics to a second node.

In various aspects, described techniques may provide for relay path selection based on end-to-end metrics, which may be more reliable than independent selection of metrics for each hop in a relay path. For example, a first relay path may include a first link between a first relay and a destination and a second link between the first relay and a source. In this example, a second relay path may include third link between a second relay and the destination and a fourth link between the second relay and the source. The first relay may have a good RSRP measurement for a link to the destination, but may have a poor RSRP with the source node that may limit a total achievable first data rate between the source and destination. The second relay may have a poorer RSRP measurement for a link to the destination, but may have a substantially better RSRP with the source node. Thus, in this example, the second relay path may support a second data rate that is higher than the first data rate and may provide more reliable communications than the first relay path. However, if each hop in the relayed communications were independently selected, the first relay path may be selected based on the higher RSRP measurement of its link with the destination node. Thus, in order to select a more favorable relay path, each available relay path may need to be sounded independently. In deployments where multiple different permutations of relay nodes are available across multiple relay nodes, sounding each available relay path would take substantial resources and overhead. Techniques as discussed herein provide for selection of relay paths based on end-to-end metrics that are measured or derived for a set of available relay paths, and thus provide for efficient selection of a relay path between a source and destination.

Particular aspects of the subject matter described herein may be implemented to realize one or more of the following potential advantages. For example, the described techniques may include features improving reliability of communications, data rates of communications, or both, by providing reliable communications paths between wireless nodes based on end-to-end metrics of available relay paths. Additionally, the described techniques provide for improving resource use, power consumption, battery life, latency, and throughput, among other benefits.

Aspects of the disclosure are initially described in the context of wireless communications systems. Aspects of the disclosure are further illustrated by and described with reference to wireless resource examples, process flows, apparatus diagrams, system diagrams, and flowcharts that relate to reference-signal-based relay selection in wireless communications.

FIG. 1 illustrates an example of a wireless communications system 100 that supports reference-signal-based relay selection in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, communications between UEs 115 or between a UE 115 and a base station 105 may use relay nodes that relay communications between a source node (e.g. a UE 115) and a destination node (e.g., a base station 105). In some cases, path selection techniques are described for a relay path between the source node and the destination node, where at least some available paths include one or more relay nodes between the source node and the destination node. In some cases, a first node (e.g., a source node or destination node) may determine reference signal resources for a set of reference signals to be transmitted between the first node and a second node through a corresponding relay path of a first subset of a set of relay paths. In some cases, the first node may receive the set of reference signals measure one or more parameters for each reference signal. In other cases, the first node may transmit the set of reference signals using the reference signal resources, and receive an indication of one or more measured parameters from the second node. The first node, based at least in part on the measurement information, may determine a set of end-to-end metrics for the set of relay paths, and select a relay path for communications with the second node based at least in part on the set of end-to-end metrics.

Figure 2:
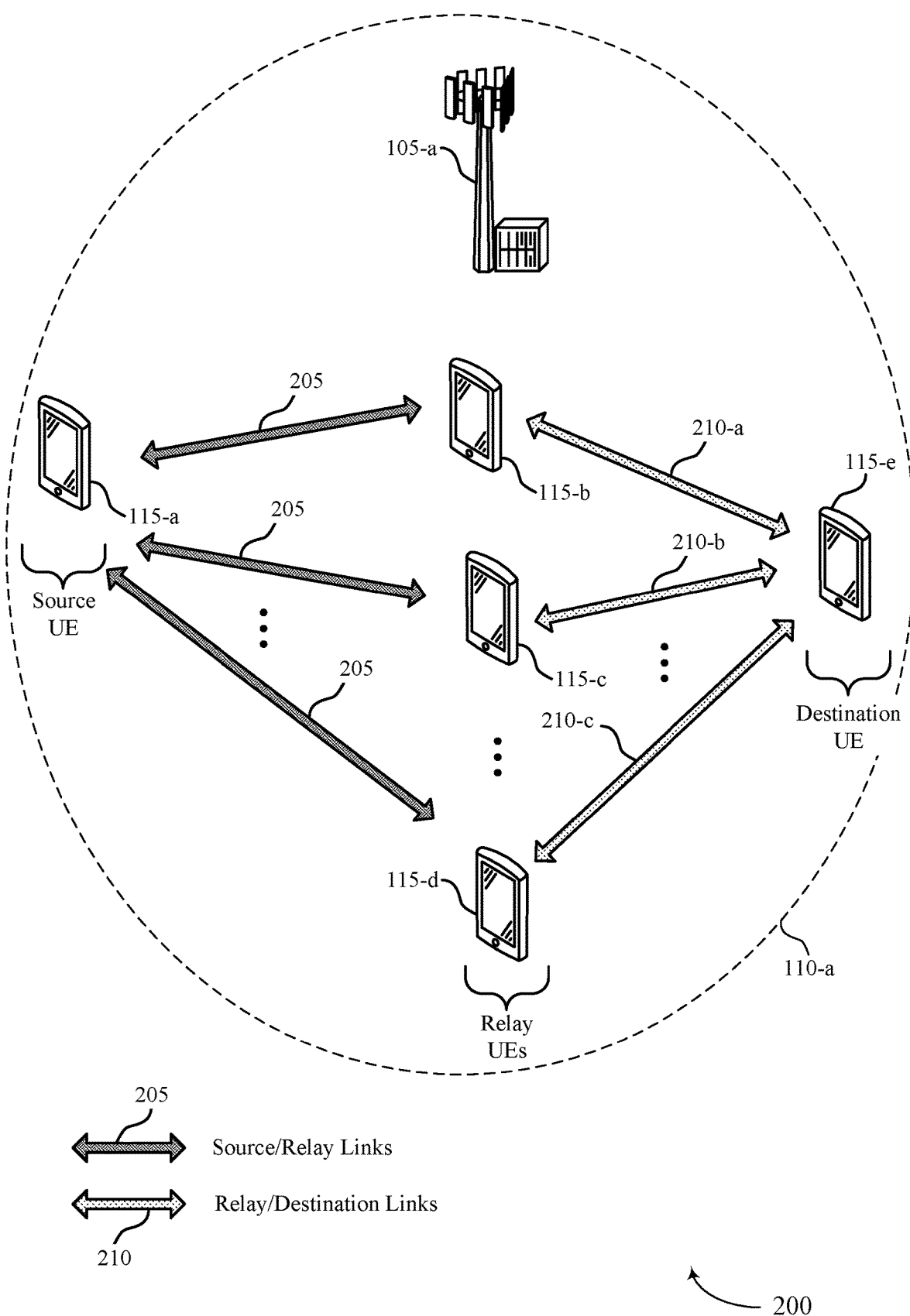
FIG. 2 illustrates an example of a portion of a wireless communications system that supports reference-signal-based relay selection in wireless communications in accordance with aspects of the present disclosure.

FIG. 2 illustrates an example of a wireless communications system 200 that supports reference-signal-based relay selection in wireless communications in accordance with aspects of the present disclosure. In some examples, wireless communications system 200 may implement aspects of wireless communications system 100. Wireless communications system 200 may include a base station 105-*a* (e.g., a base station 105 of FIG. 1) that may communicate with a number of UEs 115 (e.g., UEs 115 of FIG. 1) within coverage area 110-*a*. In some cases, the base station 105-*a* may configure resources for sidelink communications between the UEs 115, and the UEs 115 may communicate using the sidelink resources directly without the communications being transmitted to the base station 105-*a*. While the example of FIG. 2 discusses sidelink communications, techniques as discussed herein may be used in any communications that may use relaying such as, for example, sidelink communications, access link communications (e.g., Uu interface communications between a UE 115 and base station 105-*a*), IAB communications, or any combinations thereof.

In this example, UEs 115 in sidelink communications may use relaying techniques to enhance the reliability of communications. For example, source UE 115-*a*, may transmit a communication to a destination UE 115-*e* via a number of relay UEs 115-*b* through 115-*d*. In such relay communications, the source UE 115-*a* may use source/relay links 205 to transmit to the relay UEs 115-*b* through 115-*d*, which may use relay/destination links 210 to transmit to the destination UE 115-*e*. Additionally, while the example of FIG. 2 illustrates the destination as a destination UE 115-*e*, in other cases the destination may be base station 105-*a*, and relay techniques as discussed herein may provide improved reliability for communications between the base station 105-*a* and the source UE 115-*a*. While a one-hop relay is illustrated in FIG. 2, in other cases multiple hops may be present between the source UE 115-*a* and the destination UE 115-*e*, where a communication is relayed by two or more of the relay UEs 115-*b* through 115-*d*.

As discussed herein, a relay path may be selected based on one or more end-to-end metrics for each of a set of available relay paths between the source UE 115-*a* and the destination UE 115-*e*. In some cases, a discovery procedure may be based on one or more channel metrics (e.g., RSRP) associated with each relay UE 115-*b* through 115-*d*. In some cases, initial selection of potential relays may be based on previous transmissions or RSRPs (e.g., that are above certain thresholds) of individual links 205 or 210. Various examples of relay path selection are discussed herein in which a relay path of a set of available relay paths is selected based on a set of end-to-end metrics that are determined for the set of available relay paths. Such relay selection techniques may provide for enhanced reliability in communications through relay selection using relatively few overhead resources. In some cases, for a set of available relay nodes 215, end-to-end metrics may be used to estimate relay paths that use different subsets of available relay nodes based on linear reference signal methods where the base station 105-*a* (or controlling UE 115) may configure multiple reference signals for use in obtaining a relaying subset that has desirable channel characteristics. Discussed techniques avoid inefficiencies that may result from each relay UE 115-b through 115-d transmitting a same set of signals, and also help conserve power.

Figure 3:
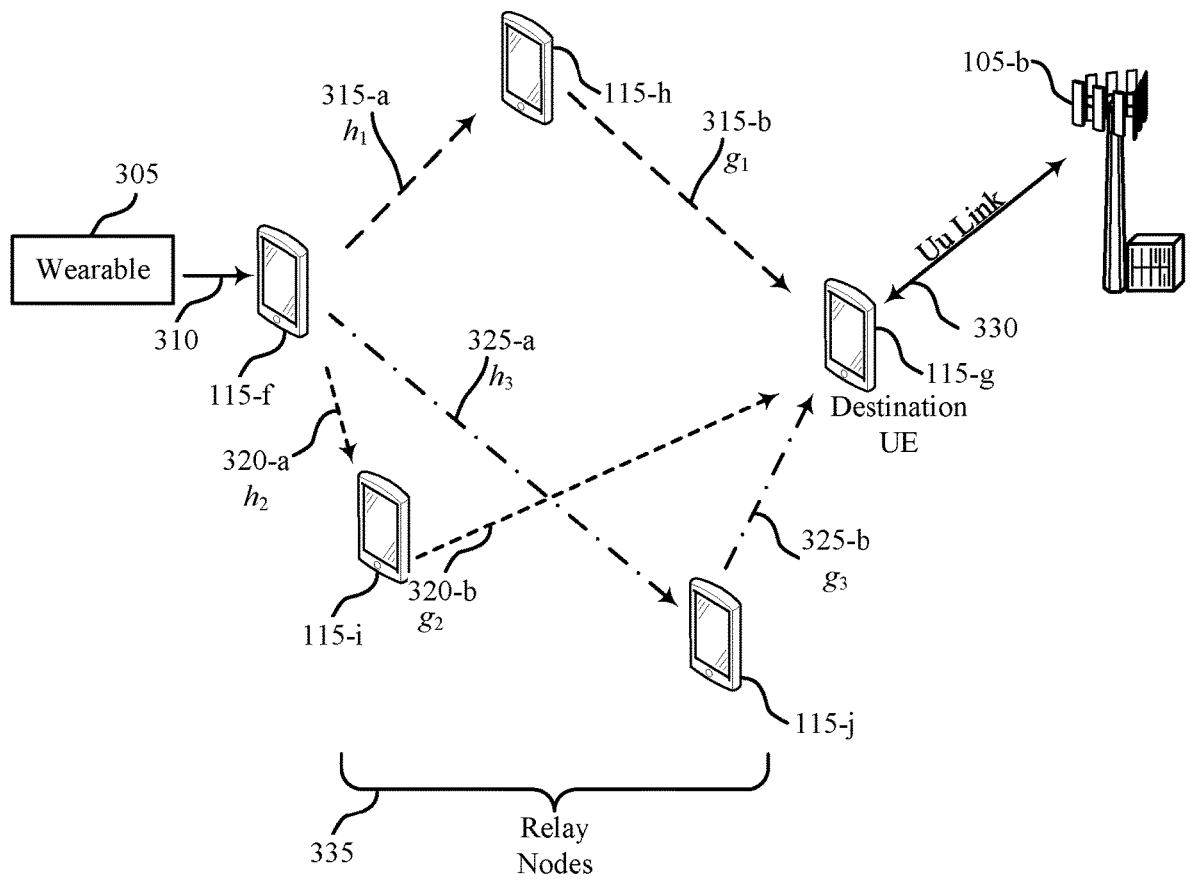
FIG. 3 illustrates an example of relayed communications that support reference-signal-based relay selection in wireless communications in accordance with aspects of the present disclosure.

FIG. 3 illustrates an example of a relayed communications 300 that supports reference-signal-based relay selection in wireless communications in accordance with aspects of the present disclosure. In some examples, relayed communications 300 may be implement aspects of wireless communications system 100 or 200. In this example, relayed communications 300 may be implemented in system that includes a base station 105-b, a source UE 115-f, a destination UE 115-g, and a set of relay nodes 335 that include a first relay UE 115-h, a second relay UE 115-i, and a third relay UE 115-j. UEs 115 and base station 105-b may be examples of corresponding devices in FIGS. 1 and 2.

In this example, a wearable device 305 may provide information to the source UE 115-f (e.g., via RF communications link 310, which may use sidelink communications in a similar matter as communications between UEs 115, or a different radio access technology). Further, the destination UE 115-g may communicate with the base station 105-b via communications link 330, which may be an example of a Uu link. In some cases, the set of relay nodes 335 may be identified based on a configuration from a controlling UE 115 or base station 105-b, based on discovery signals transmitted among UEs 115, or any combinations thereof. In some cases, UEs 115 may transmit discovery signals using sidelink resources and may identify one or more neighboring UEs 115 that are relaying candidates. In some cases, the controlling UE 115 or base station 105-a may identify the set of relay nodes 335 based on measurement reports that identify one or more nodes and associated channel metrics (e.g., RSRP). The set of relay nodes 335 may provide a number of potential relay paths between the source UE 115-f and destination UE 115-g. In some cases, the base station 105-a or controlling UE (e.g. source UE 115-f or destination UE 115-g) may configure a first number of reference signal resources (e.g., where the first number corresponds to the number of relay nodes in the set of relay nodes 335). In some cases, each reference signal resource may be for one or more antenna ports (e.g., up to L antenna ports), where the number of antenna ports may be used to determine channel ranks (e.g., a number of transmission layers to use for communications).

In some cases, the base station 105-b or controlling UE 115 may also configure a combiner indicator codebook (e.g., a RS_Combiner_Indicator codebook). The combiner indicator codebook may be reported by the source UE 115-f or destination UE 115-g, and include channel metrics associated with the configured reference signal resources. In some cases, the combiner indicator codebook may include measurements from the measured number of ports (e.g., corresponding to the first number of reference signal resources) from the reference signal resources, assuming 1 port per transmission, and may be used to derive a set of "virtual Z ports," where the Z ports represent combination of relay channels (2 relays, 3 relays, etc.). In some cases, for each entry in the combiner indicator codebook, a single port may be derived using one or more reference signal metrics from measured channels (e.g., from the set of relay nodes 335). For example, a first relay path 315 may include a first link 315-a having a first channel metric $h_1$ and a second link 315-b having a second channel metric $g_1$, and a first port may be derived from $h_1\alpha_1g_1$, where $\alpha$ indicates a set beamforming weights that are applied at the respective relay as part of analog beamforming of the relayed signal. In this example, reference signals may be configured for a second relay path 320 and a third relay path 325, which may provide that a second port may be derived from $h_2\alpha_2g_2$, and a third port may be derived from $h_3\alpha_3g_3$. Further, one or more virtual ports may be derived from the combiner indicator codebook that may be based on combinations of measured channels. For example, the combiner indicator codebook may indicate that the base station 105-b or controlling UE 115 is to derive $h_1\alpha_1g_1+h_2\alpha_2g_2+ \ldots +h_K\alpha_Kg_K$ using a combiner indicator codebook vector of [1, 1, . . . , 1, 0, . . . , 0], where a '1' indicates that a corresponding metric is to be used to derive a virtual port and a '0' indicates that the corresponding metric is not included in the calculation. Thus, multiple additional ports may be estimated (e.g., that represent a joint relayed transmission of two or more relay nodes of the set of relay nodes 335, where separate reference signals are not required to obtain the estimate for the additional ports.

In some cases, the source UE 115-f may be the monitoring node for relay selection and may transmit the reference signals. In such a case, the destination UE 115-g may measure the received reference signals from the set of relay nodes 335 and signal a list of ordered subset of relays based on the derived metrics from the combiner indicator codebook. In some cases, the destination UE 115-g may indicate one or more combiner indicator codebook vector indices to signal ordered list of relays (e.g., that indicates which relays of the set of relay nodes 335 the active relays should be active in the relay path and transmitting to the destination using the same time/frequency resources). The ordered list may be based on channel metrics, such as RSRP, reference signal received quality (RSRQ), signal to noise ratio (SNR), signal to interference and noise ratio (SINR), modulation and coding scheme (MCS) index, or any combinations thereof. In other cases, the destination UE 115-g may transmit the reference signals, and the source UE 115-f may measure the received signals and determine the subset of relay nodes of the set of relay nodes 335 that are to be included in a relay path. The source UE 115-f may indicate the ordered list of relay paths with different subsets of relays of the set of relay nodes 335. In further cases, the destination UE 115-g may monitor reference signals and select a relay path based on an ordered list of combiner indicator codebook vector indices that are based on channel metrics of the reference signals.

In some cases, the set of relay nodes 335 may use AF relaying techniques. In such cases, multiple reference signals may be configured, where α number of reference signals corresponds to a number of nodes in the set of relay nodes 335, for estimation or derivation of end-to-end channel metrics of each relay path of a set of relay paths that may be formed from different combinations of subsets of the set of relay nodes 335. Based on measurements of the configured reference signals and measured ports, other ports may be derived for other relay paths based on combinations of different subsets or relay nodes (e.g., based on a combiner indicator codebook). In some cases, the source UE 115-f may transmit the reference signals and select a relay path for communications. In such cases, the destination UE 115-g may transmit one or more combiner indicator codebook vectors indices based on some potential relaying lists (e.g., an ordered list based on the reference signal metrics or combinations of metrics), that may be effective for forwarding of transport blocks (TBs). In some cases, a selected relay path may include multiple concurrently active relay nodes that use joint transmissions using the same time and frequency resources. In other cases, the source UE 115-f may transmit the reference signals and the destination UE 115-g may select the relay path and reserve resources for packet or TB relaying based on the selected relay path. In further cases, the destination UE 115-g may transmit the reference signals and the source UE 115-f may measure the reference signals and either select the relay path or send an indication of combiner indicator codebook vectors to the destination UE 115-g for selection of the relay path.

For example, a first relay UE 115-h may receive a reference signal on the first link 315-a of first relay path 315, having an estimated channel of $h_1$ (e.g., estimated channel from the source UE 115-f to the first relay UE 115-h). The first relay UE 115-h may amplify and forward the reference signals using beamforming parameters $\alpha_1$, and the received signal at the destination UE 115-g via second link 315-b of first relay path 315 may be approximated as $h_1\alpha_1g_1$. Likewise, a second relay UE 115-i and third relay UE 115-j may amplify respective reference signals. The destination UE 115-g may determine if the signals received from the first relay UE 115-h and second relay UE 115-i (and/or third relay UE 115-j) may be constructively added. For example, if $h_1\alpha_1g_1$ and $h_2\alpha_2g2$ are estimated at the destination UE 115-g, destination UE 115-g can sum them (i.e., $h_1\alpha_1g_1 + h_2a_2g_2$) and check the received power or achievable rates. In some cases, $|h_1\alpha_1g_1|^2 > |h_1\alpha_1g_1+h_2\alpha_2g_2|^2$ (i.e., channels are destructively added), and hence nodes in the relay path should be selected to provide enhanced likelihood of successful reception. Such techniques may also be used for the third relay UE 115-j as well. Thus, several combinations are available for relay selection (e.g., any combinations of K relays where K is the number of relays in the set of relay nodes 335.

In some cases, the UEs 115 in the set of relay nodes 335 may be "fully" analog AF relays in which information associated with a reference signal is not decoded at the UE 115. In such cases, the source of the reference signal from the relay that is retransmitted may be provided through including an identification (ID) of the original source that initiated the reference signal and the ID of the original destination of the RS in sidelink control information. In some cases, the source and destination ID of a reference signal may be identified based on reserved resources for the reference signals, which may be communicated to all potential relays that would help the source-destination pair, and may be forwarded a single relay UE, such that each node will know the transmitter of the reference signal at a certain time and there is no ambiguity at the end/final receiver. In other examples, DF relaying may be used, an example of which is discussed with reference to FIG. 4.

Figure 4:
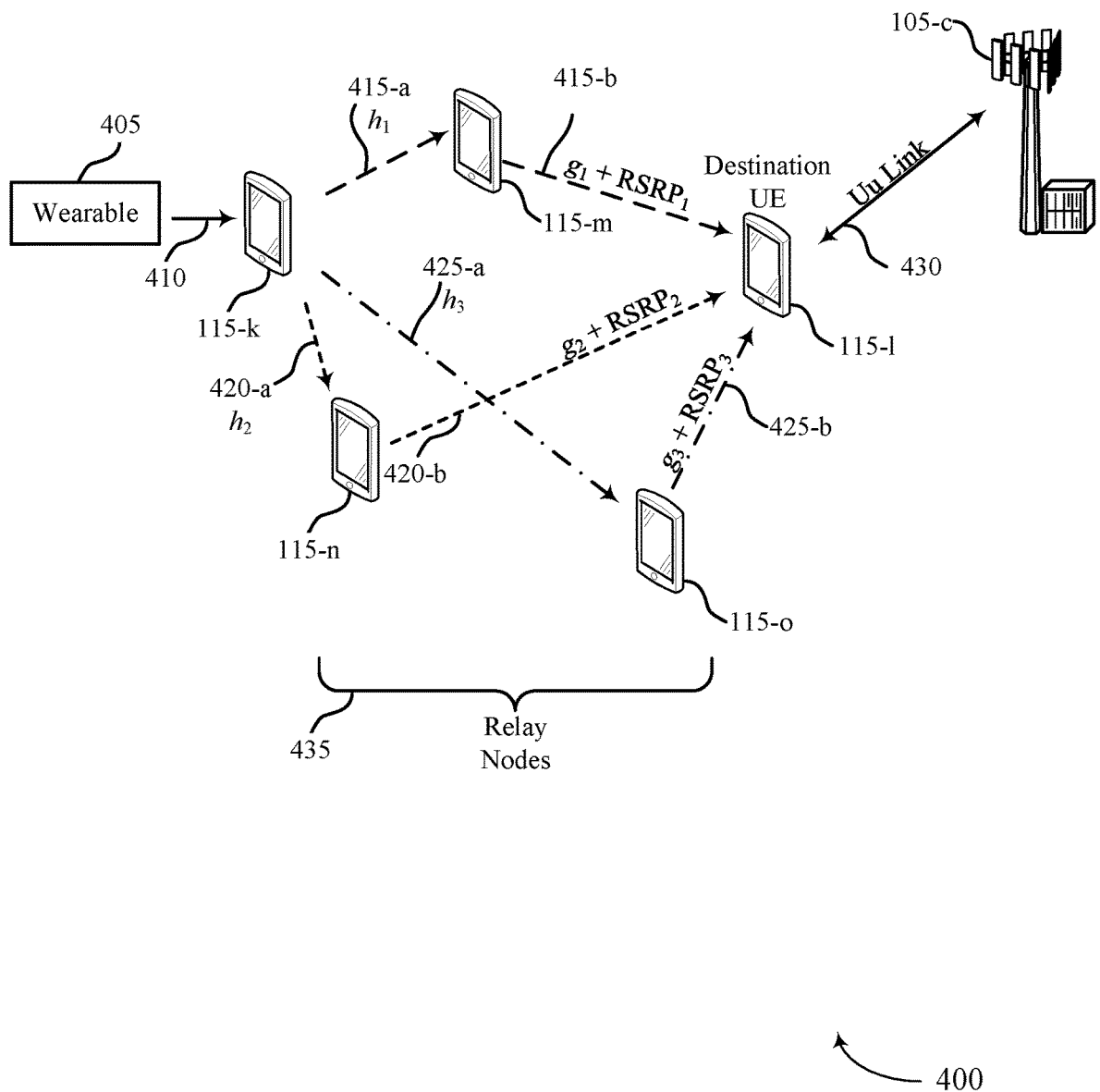
FIG. 4 illustrates an example of relayed communications that support reference-signal-based relay selection in wireless communications in accordance with aspects of the present disclosure.

FIG. 4 illustrates an example of a relayed communications 400 that supports reference-signal-based relay selection in wireless communications in accordance with aspects of the present disclosure. In some examples, relayed communications 400 may be implement aspects of wireless communications system 100 or 200. In this example, relayed communications 400 may be implemented in system that includes a base station 105-c, a source UE 115-k, a destination UE 115-1, and a set of relay nodes 435 that include a first relay UE 115-m, a second relay UE 115-n, and a third relay UE 115-0. UEs 115 and base station 105-c may be examples of corresponding devices in FIGS. 1 through 3.

In this example, a wearable device 405 may provide information to the source UE 115-k (e.g., via RF communications link 410, which may use sidelink communications in a similar matter as communications between UEs 115, or a different radio access technology). Further, the destination UE 115-1 may communicate with the base station 105-c via communications link 430, which may be an example of a Uu link. In some cases, the set of relay nodes 435 may be identified based on a configuration from a controlling UE 115 or base station 105-c, based on discovery signals transmitted among UEs 115, or any combinations thereof. In some cases, the base station 105-a or controlling UE (e.g. source UE 115-k or destination UE 115-1) may configure a first number of reference signal resources (e.g., where the first number corresponds to the number of relay nodes in the set of relay nodes 435). In some cases, each reference signal resource may be for one or more antenna ports (e.g., up to L antenna ports), where the number of antenna ports may be used to determine channel ranks (e.g., a number of transmission layers to use for communications).

In this example, DF relaying may be used. Unlike AF relaying, DF relaying capacity/rate depends on a minimum rate (or SINR) of the two links connecting the relay to the transmitting and receiving sides. In some cases, a relay UE 115 may signal its RSRP to the receiver side (e.g., the destination UE 115-1) then the forwarded packet will be based on the combined link. In such cases, each UE of the set of relay nodes 435 may decode received packets, so there is no way to combine from the source UE 115-k to the relay nodes 435 (e.g., joint transmissions using the same time/frequency resources is not used for transmissions), but based on the provided RSRP information, combining is possible at the destination UE 115-1. Because the destination UE 115-1 may combine signals from multiple relays, the RSRP information along with measured reference signal metrics may be used to select a preferred relay path.

In some cases, each UE 115 of the set of relay nodes 435 may quantizes and signal its RSRP of the link between itself and the source UE 115-k (e.g., RSRP based on $h_i$ for relay UE i) along with a transmission of its reference signal to the destination UE 115-1 (e.g., in a TDM manner). In some cases, UEs 115 of the set of relay nodes 435 may relay RSRPs of other relay nodes as needed. The destination UE 115-1 may compute the RSRP of each received reference signal from the UEs 115 of the set of relay nodes 534, and based on a list of information (e.g., [$\{RSRP_1,g_1\}$, $\{RSRP_2, g_2\}$ ..., $\{RSRP_K, g_K\}$ ], it can create a reference signal combiner indicator codebook vector for relays where combinations of RSRPs, as well as coherent channel combining from relays to the destination UE 115-1, may be used to derive end-to-end metrics.

In some cases, the destination UE 115-1 may use different alternatives to estimate the channels $g_i$ of the UEs 115 of the set of relay nodes 435, and the estimated channels may be combined with $h_0$ (the channel estimate for RF communications link 410). The combining of $g_i+g_k$ may be compared with $g_i$, $g_k$ and other relaying possibilities, to determine an ordered list of preferred relay paths. In some cases, RSRP information from the relaying for the links may be provided to the source UE 115-k, which may assist in identifying preferred end-to-end metrics for SNR and RSRP of both hops.

Figure 5:
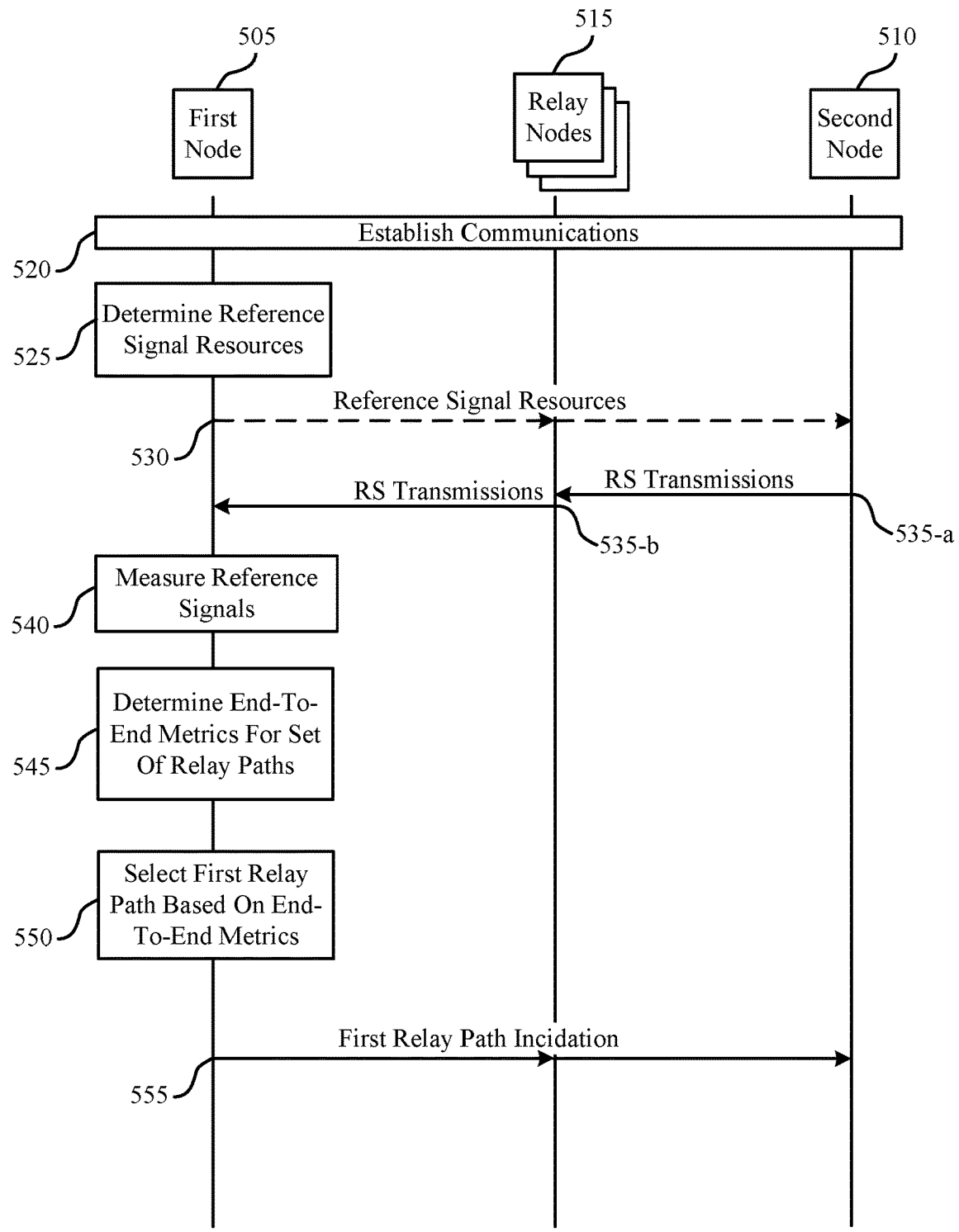
FIG. 5 illustrates an example of a process flow that supports reference-signal-based relay selection in wireless communications in accordance with aspects of the present disclosure.

FIG. 5 illustrates an example of a process flow 500 that supports reference-signal-based relay selection in wireless communications in accordance with aspects of the present disclosure. Process flow 500 may include multiple nodes, including a first node 505 (e.g., a source node or a destination node) a second node 510 (e.g., a source node or a destination node), and relay nodes 515 (e.g., relay UEs), which may be examples of devices as described herein. In some cases, first node 505, second node 510, and third node 515 communicate over a sidelink channel, an access channel, or combinations thereof. It is to be understood that any types of wireless nodes may act as the first node 505, second node 510, and relay nodes 515 (e.g., UEs, base stations, dedicated relay devices, access points, etc.), and the techniques discussed herein apply to any such wireless nodes that may perform relayed communications via one or more relay nodes.

In the following description of the process flow 500, the operations between the nodes 505 through 515 may be transmitted in a different order than the exemplary order shown, or the operations may be performed in different orders or at different times. Certain operations may also be left out of the process flow 500, or other operations may be added to the process flow 500.

At 520, the first node 505, second node 510, and relay nodes 515 may establish communications. For example, sidelink resources may be allocated for sidelink communications between the nodes 505 through 515, which may use the allocated resources for sidelink transmissions and receptions. In some cases, a serving base station (which may be an example of a first node 505 or a second node 510) may configure relayed communications and provide resources for relayed communications (e.g., one or more scheduled resource grant configurations, such as semi-persistent scheduling or configured grant resources, that may be used for relayed communications). Further, in some cases, one or more parameters for the relayed communications, resource grants, or both, may be provided in an activation or reactivation DCI that activates a relayed communications configuration.

At 525, the first node 505 may determine reference signal resources for the transmission of one or more reference signals. In some cases, a number of reference signal resource may be set to correspond to a number of relay nodes 515 that are available to provide relayed communications between the first node 505 and the second node 510. In some cases, the reference signal resources may provide resources for a channel state information (CSI) reference signal, a synchronization signal block (SSB), a demodulation reference signal (DMRS), or any other reference signal that may be measured at a receiving device to provide an estimate of channel metrics. Optionally, at 530, the first node 505 may transmit an indication of the reference signal resources to the relay nodes 515 and the second node 510.

At 535, the second node 510 may transmit the reference signal transmissions to the first node 505 via the relay nodes 515. In some cases, a number of reference signals may be equal to a number of the relay nodes 515. At 540, the first node 540 may measure the reference signals. In some cases, the first node 540 may determine one or more channel metrics (e.g., RSRP, RSRQ, SNR, SINR, MCS, or any combinations thereof) based on measurements of the reference signals.

At 545, the first node 505 may determine a set of end-to-end metrics for a set of relay paths associated with the relay nodes 515. In some cases, the set of relay paths includes individual relay paths, paths for joint relayed transmissions for different combinations of relay nodes 515 (e.g., transmissions from the second node 510 that use same time and frequency resources and that are relayed using same time and frequency resources), or any combinations thereof. At 550, the first node 505 may select a first relay path from the set of relay paths for communications, based on the end-to-end metrics. In some cases, the first relay path may be a relay path that has a highest metric (e.g., a highest derived RSRP) or a metric that is acceptable for communications (e.g., that exceeds a threshold value for reliable communications).

At 555, the first node 505 may transmit an indication of the first relay path to the second node 510, which may be transmitted via one or more relay nodes 515. In some cases, the first node 505 may reserve resources for relayed communications via one or more relay nodes 515 that are present in the selected first relay path.

While the example of FIG. 5 shows a first node 505 that determines the reference signal resources and selects the first relay path, in other examples, as discussed herein, the second node may perform one or both the determination of the reference signal resources or the selection of the first relay path. In still further cases, the first node 505 may transmit the reference signals for measurement by the second node 510.

Figure 6:
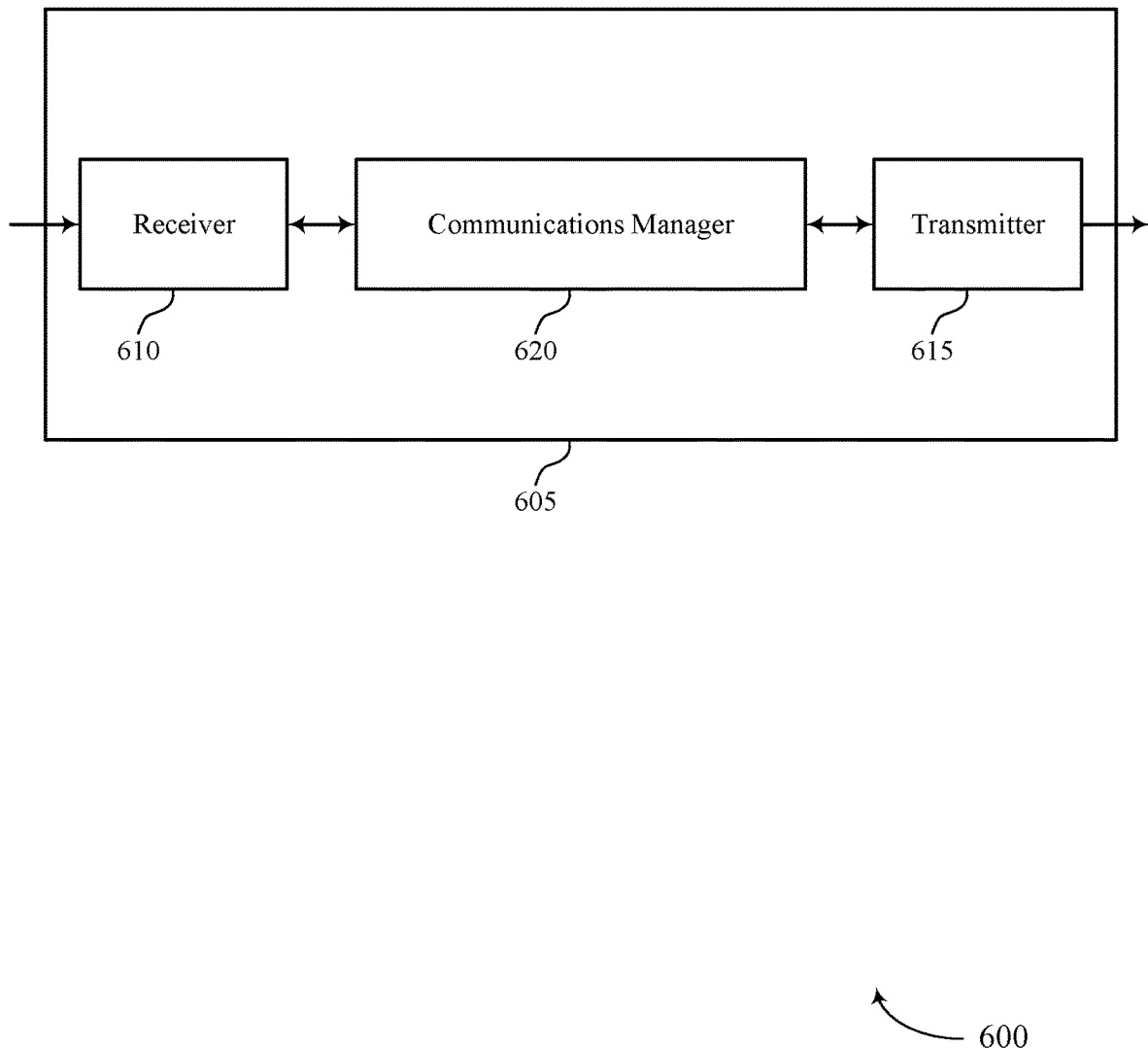
FIGS. 6 and 7 show block diagrams of devices that support reference-signal-based relay selection in wireless communications in accordance with aspects of the present disclosure.

FIG. 6 shows a block diagram 600 of a device 605 that supports reference-signal-based relay selection in wireless communications in accordance with aspects of the present disclosure. The device 605 may be an example of aspects of a UE 115 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to reference-signal-based relay selection in wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reference-signal-based relay selection in wireless communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of reference-signal-based relay selection in wireless communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first node in accordance with examples as disclosed herein. For example, the communications manager 620 may be configured as or otherwise support a means for determining reference signal resources for a set of multiple reference signals to be transmitted between the first node and a second node through a corresponding relay path of a first subset of a set of relay paths, where each relay path of the first subset of relay paths includes a relay node of a set of relay nodes that relay transmissions between the first node and the second node. The communications manager 620 may be configured as or otherwise support a means for obtaining measurement information for each of the set of multiple reference signals. The communications manager 620 may be configured as or otherwise support a means for determining, based on the measurement information, a set of end-to-end metrics for the set of relay paths between the first node and the second node, each relay path having one or more relay nodes of the set of relay nodes. The communications manager 620 may be configured as or otherwise support a means for selecting a first relay path based on the set of end-to-end metrics. The communications manager 620 may be configured as or otherwise support a means for transmitting an indication of the first relay path to the second node.

Additionally or alternatively, the communications manager 620 may support wireless communication in accordance with examples as disclosed herein. For example, the communications manager 620 may be configured as or otherwise support a means for determining, at a second node, reference signal resources for a set of multiple reference signals to be transmitted between a first node and the second node through a corresponding relay path of a first subset of a set of relay paths, where each relay path of the first subset of relay paths includes a relay node of a set of relay nodes that relay transmissions between the first node and the second node. The communications manager 620 may be configured as or otherwise support a means for transmitting, to the first node, one or more of the set of multiple reference signals via the set of relay nodes, or a set of end-to-end metrics that are based on one more measurements of the set of multiple reference signals that are received at the second node. The communications manager 620 may be configured as or otherwise support a means for receiving, form the first node, an indication of a first relay path of the set of relay paths to be used for relayed communication between the first node and the second node.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for relay path selection that provides enhanced reliability of communications, enhanced data rates of communications, or both, by providing reliable communications paths between wireless nodes based on end-to-end metrics of available relay paths. Additionally, the described techniques provide for improving resource use, power consumption, battery life, latency, and throughput, among other benefits.

Figure 7:
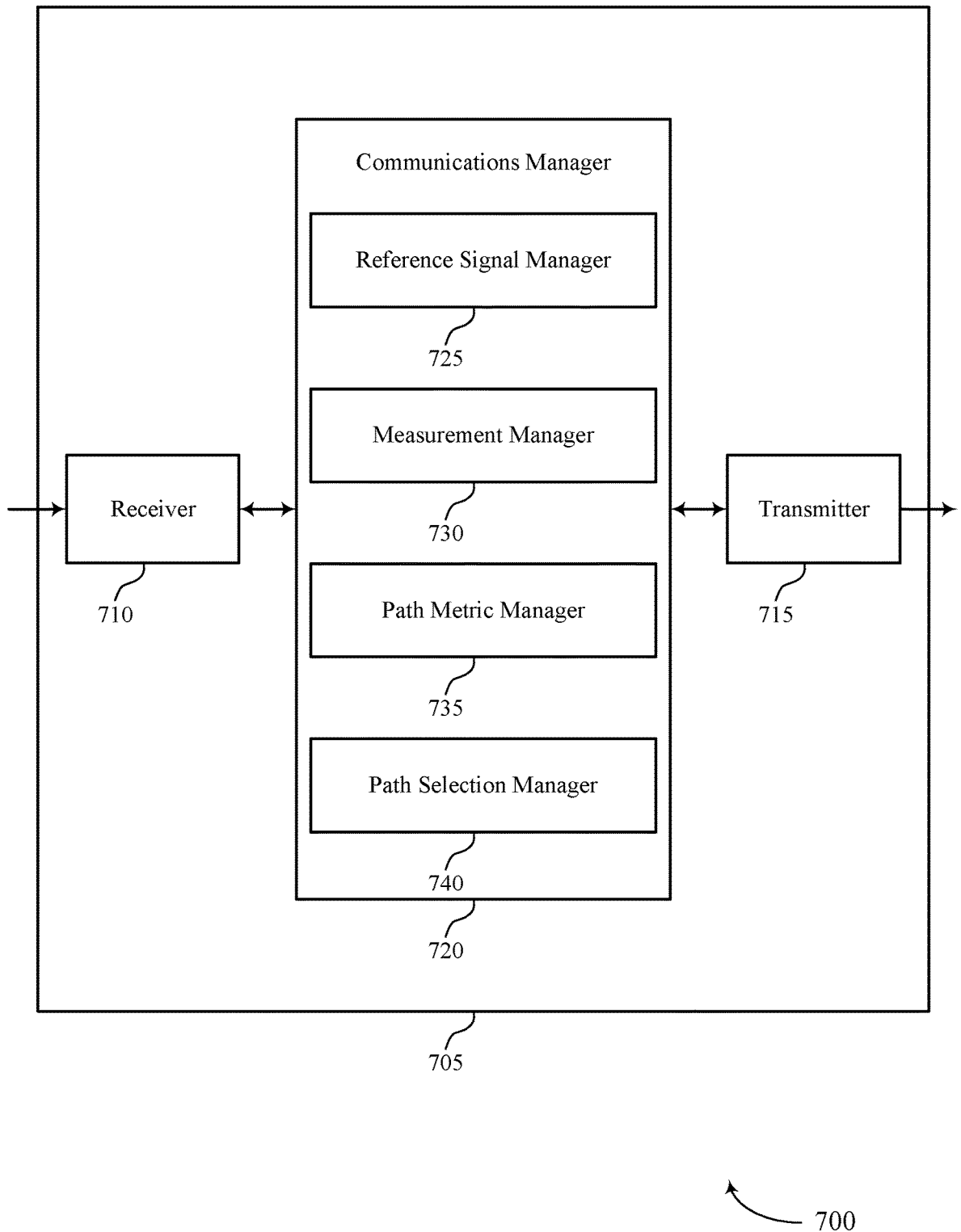

FIG. 7 shows a block diagram 700 of a device 705 that supports reference-signal-based relay selection in wireless communications in accordance with aspects of the present disclosure. The device 705 may be an example of aspects of a device 605, a UE 115, or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to reference-signal-based relay selection in wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to reference-signal-based relay selection in wireless communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of reference-signal-based relay selection in wireless communications as described herein. For example, the communications manager 720 may include a reference signal manager 725, a measurement manager 730, a path metric manager 735, a path selection manager 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first node in accordance with examples as disclosed herein. The reference signal manager 725 may be configured as or otherwise support a means for determining reference signal resources for a set of multiple reference signals to be transmitted between the first node and a second node through a corresponding relay path of a first subset of a set of relay paths, where each relay path of the first subset of relay paths includes a relay node of a set of relay nodes that relay transmissions between the first node and the second node. The measurement manager 730 may be configured as or otherwise support a means for obtaining measurement information for each of the set of multiple reference signals. The path metric manager 735 may be configured as or otherwise support a means for determining, based on the measurement information, a set of end-to-end metrics for the set of relay paths between the first node and the second node, each relay path having one or more relay nodes of the set of relay nodes. The path selection manager 740 may be configured as or otherwise support a means for selecting a first relay path based on the set of end-to-end metrics. The path selection manager 740 may be configured as or otherwise support a means for transmitting an indication of the first relay path to the second node.

Additionally or alternatively, the communications manager 720 may support wireless communication in accordance with examples as disclosed herein. The reference signal manager 725 may be configured as or otherwise support a means for determining, at a second node, reference signal resources for a set of multiple reference signals to be transmitted between a first node and the second node through a corresponding relay path of a first subset of a set of relay paths, where each relay path of the first subset of relay paths includes a relay node of a set of relay nodes that relay transmissions between the first node and the second node. The reference signal manager 725 may be configured as or otherwise support a means for transmitting, to the first node, one or more of the set of multiple reference signals via the set of relay nodes, or a set of end-to-end metrics that are based on one more measurements of the set of multiple reference signals that are received at the second node. The path selection manager 740 may be configured as or otherwise support a means for receiving, form the first node, an indication of a first relay path of the set of relay paths to be used for relayed communication between the first node and the second node.

Figure 8:
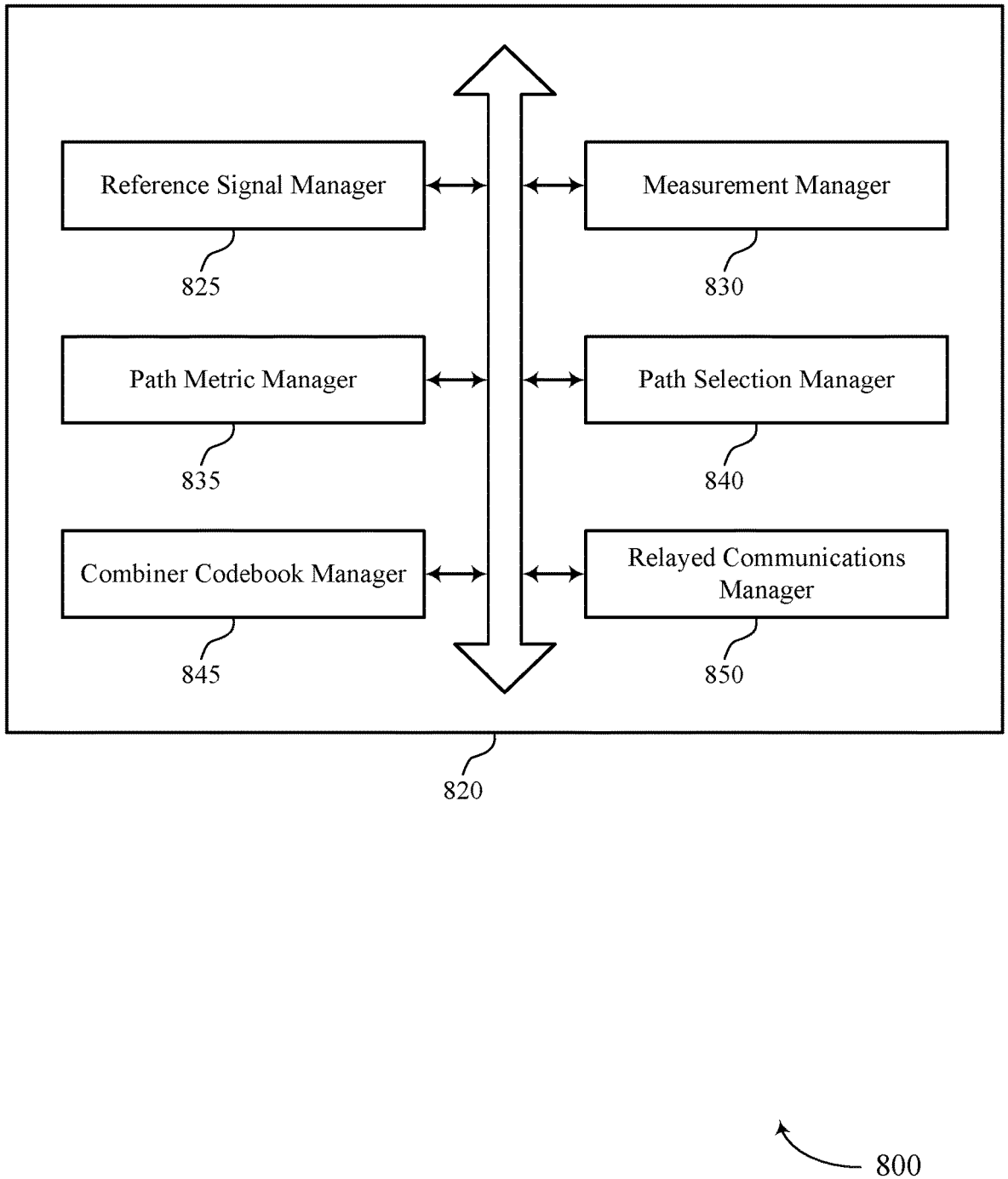
FIG. 8 shows a block diagram of a communications manager that supports reference-signal-based relay selection in wireless communications in accordance with aspects of the present disclosure.

FIG. 8 shows a block diagram 800 of a communications manager 820 that supports reference-signal-based relay selection in wireless communications in accordance with aspects of the present disclosure. The communications manager 820 may be an example of aspects of a communications manager 620, a communications manager 720, or both, as described herein. The communications manager 820, or various components thereof, may be an example of means for performing various aspects of reference-signal-based relay selection in wireless communications as described herein. For example, the communications manager 820 may include a reference signal manager 825, a measurement manager 830, a path metric manager 835, a path selection manager 840, a combiner codebook manager 845, a relayed communications manager 850, or any combination thereof. Each of these components may communicate, directly or indirectly, with one another (e.g., via one or more buses).

The communications manager 820 may support wireless communication at a first node in accordance with examples as disclosed herein. The reference signal manager 825 may be configured as or otherwise support a means for determining reference signal resources for a set of multiple reference signals to be transmitted between the first node and a second node through a corresponding relay path of a first subset of a set of relay paths, where each relay path of the first subset of relay paths includes a relay node of a set of relay nodes that relay transmissions between the first node and the second node. The measurement manager 830 may be configured as or otherwise support a means for obtaining measurement information for each of the set of multiple reference signals. The path metric manager 835 may be configured as or otherwise support a means for determining, based on the measurement information, a set of end-to-end metrics for the set of relay paths between the first node and the second node, each relay path having one or more relay nodes of the set of relay nodes. The path selection manager 840 may be configured as or otherwise support a means for selecting a first relay path based on the set of end-to-end metrics. In some examples, the path selection manager 840 may be configured as or otherwise support a means for transmitting an indication of the first relay path to the second node. In some examples, the reference signal resources include resources for one reference signal transmission for each relay node of the set of relay nodes.

In some examples, the combiner codebook manager 845 may be configured as or otherwise support a means for identifying a reference signal combiner codebook that indicates a first subset of the set of end-to-end metrics that each have a corresponding direct measurement based on a dedicated reference signal for respective relay paths of a first subset of relay paths, and that indicates a second subset of the set of end-to-end metrics that are derived from one or more combinations of end-to-end metrics of the first subset of end-to-end metrics, the second subset of end-to-end metrics associated with a second subset of relay paths that is different than the first subset of relay paths. In some examples, the combiner codebook manager 845 may be configured as or otherwise support a means for where the set of end-to-end metrics is determined based on the reference signal combiner codebook.

In some examples, the reference signal manager 825 may be configured as or otherwise support a means for transmitting the set of multiple reference signals to the second node through the set of relay nodes. In some examples, the measurement manager 830 may be configured as or otherwise support a means for where the obtaining the measurement information includes receiving, from the second node, the measurement information for each of the set of multiple reference signals.

In some examples, to support obtaining the measurement information, the measurement manager 830 may be configured as or otherwise support a means for measuring each reference signal of the set of multiple reference signals. In some examples, the first node is a source node that transmits information to the second node via one or more relay nodes of the set of relay nodes using the first relay path, or the first node is a destination node that receives information from the second node via one or more relay nodes of the set of relay nodes using the first relay path. In some examples, each relay node of the set of relay nodes performs amplify-and-forward (AF) relaying between the first node and the second node, and where the transmitted reference signal is AF relayed by each relay node.

In some examples, the reference signal manager 825 may be configured as or otherwise support a means for transmitting the set of multiple reference signals to the second node via the set of relay nodes. In some examples, the path metric manager 835 may be configured as or otherwise support a means for receiving, from the second node, a set of combiner indicator vectors that indicate potential relay paths, where the measurement information is obtained from the set of combiner indicator vectors. In some examples, the set of combiner indicator vectors indicates one or more end-to-end metrics for candidate relay paths of the set of relay paths having associated end-to-end metrics that support forward of transport blocks (TBs) from the first node to the second node.

In some examples, the measurement manager 830 may be configured as or otherwise support a means for receiving the set of multiple reference signals from the second node via the set of relay nodes, and where the obtaining the measurement information includes measuring one or more parameters of the received reference signals. In some examples, the relayed communications manager 850 may be configured as or otherwise support a means for reserving channel resources of the first relay path for packet relaying of packets transmitted by the second node to the first node.

In some examples, the reference signal manager 825 may be configured as or otherwise support a means for transmitting a second set of multiple reference signals to the second node via the set of relay nodes. In some examples, the path selection manager 840 may be configured as or otherwise support a means for receiving, from the second node, a second indication of a second relay path for relaying transport blocks from the first node to the second node. In some examples, each relay node of the set of relay nodes performs analog AF relaying between the first node and the second node, and where the transmitted reference signals that are relayed include an identification of a source of the corresponding reference signal. In some examples, each relay node of the set of relay nodes performs analog AF relaying between the first node and the second node, and where a source of each reference signal is identified based on wireless resources used to transmit the reference signal, a starting time of the reference signal, or any combinations thereof.

In some examples, each relay node of the set of relay nodes performs DF relaying between the first node and the second node, and where each relay node quantizes and reports a reference signal measurement parameter of a received reference signal of the set of multiple reference signals, and transmits an associated reference signal of the set of multiple reference signals. In some examples, the determining is based on the reference signal measurement parameters from the set of relay nodes and one or more measurements of the reference signals transmitted by the relay nodes. In some examples, the obtaining includes computing a RSRP of each reference signal from the set of relay nodes, and generating, based on the RSRP of each reference signal and the reference signal measurement parameters, a reference signal combiner indicator vector that indicates one or more combinations of relay nodes that are candidates for selection as the first relay path.

Additionally or alternatively, the communications manager 820 may support wireless communication in accordance with examples as disclosed herein. In some examples, the reference signal manager 825 may be configured as or otherwise support a means for determining, at a second node, reference signal resources for a set of multiple reference signals to be transmitted between a first node and the second node through a corresponding relay path of a first subset of a set of relay paths, where each relay path of the first subset of relay paths includes a relay node of a set of relay nodes that relay transmissions between the first node and the second node. In some examples, the reference signal manager 825 may be configured as or otherwise support a means for transmitting, to the first node, one or more of the set of multiple reference signals via the set of relay nodes, or a set of end-to-end metrics that are based on one more measurements of the set of multiple reference signals that are received at the second node. In some examples, the path selection manager 840 may be configured as or otherwise support a means for receiving, form the first node, an indication of a first relay path of the set of relay paths to be used for relayed communication between the first node and the second node. In some examples, the reference signal resources include resources for one reference signal transmission for each relay node of the set of relay nodes.

In some examples, the combiner codebook manager 845 may be configured as or otherwise support a means for identifying a reference signal combiner codebook that indicates a first subset of the set of end-to-end metrics that each have a corresponding direct measurement based on a dedicated reference signal for respective relay paths of a first subset of relay paths, and that indicates a second subset of the set of end-to-end metrics that are derived from one or more combinations of end-to-end metrics of the first subset of end-to-end metrics, the second subset of end-to-end metrics associated with a second subset of relay paths that is different than the first subset of relay paths. In some examples, the set of end-to-end metrics is determined based on a reference signal combiner codebook.

In some examples, the measurement manager 830 may be configured as or otherwise support a means for receiving the set of multiple reference signals from the first node via the set of relay nodes. In some examples, the measurement manager 830 may be configured as or otherwise support a means for measuring one or more reference signal parameters of each of the set of multiple reference signals, and where the set of end-to-end metrics are determined based on the one or more reference signal parameters.

In some examples, the set of multiple reference signals are transmitted by the second node, and the path metric manager 835 may be configured as or otherwise support a means for receiving, from the first node, a set of reference signal combiner indicator vectors that indicate one or more end-to-end metrics for candidate relay paths of the set of relay paths having associated end-to-end metrics that support forwarding of TBs from the first node to the second node.

In some examples, each relay node of the set of relay nodes performs AF relaying between the first node and the second node, and where the transmitted reference signals are AF relayed by each relay node. In some examples, each relay node of the set of relay nodes performs DF relaying between the first node and the second node, and where each relay node quantizes and reports a reference signal measurement parameter of a received reference signal of the set of multiple reference signals, and transmits an associated reference signal of the set of multiple reference signals, and where. In some examples, the set of end-to-end channel metrics are determined is based on the reference signal measurement parameters from the set of relay nodes and one or more measurements of the reference signals transmitted by the relay nodes.

Figure 9:
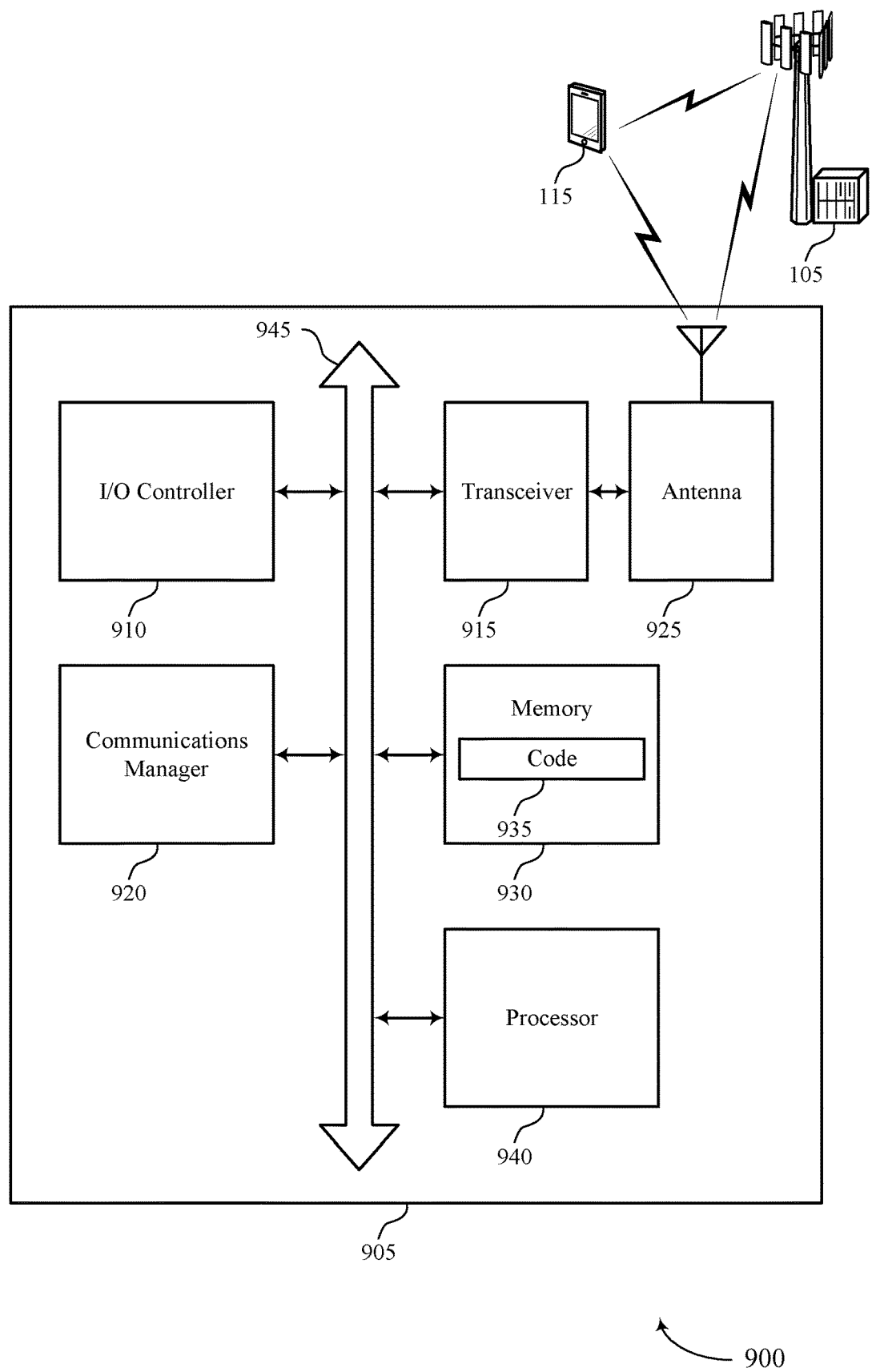
FIG. 9 shows a diagram of a system including a base station that supports reference-signal-based relay selection in wireless communications in accordance with aspects of the present disclosure.

FIG. 9 shows a diagram of a system 900 including a device 905 that supports reference-signal-based relay selection in wireless communications in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting reference-signal-based relay selection in wireless communications). For example, the device 905 or a component of the device 905 may include a processor 940 and memory 930 coupled to the processor 940, the processor 940 and memory 930 configured to perform various functions described herein.

The communications manager 920 may support wireless communication at a first node in accordance with examples as disclosed herein. For example, the communications manager 920 may be configured as or otherwise support a means for determining reference signal resources for a set of multiple reference signals to be transmitted between the first node and a second node through a corresponding relay path of a first subset of a set of relay paths, where each relay path of the first subset of relay paths includes a relay node of a set of relay nodes that relay transmissions between the first node and the second node. The communications manager 920 may be configured as or otherwise support a means for obtaining measurement information for each of the set of multiple reference signals. The communications manager 920 may be configured as or otherwise support a means for determining, based on the measurement information, a set of end-to-end metrics for the set of relay paths between the first node and the second node, each relay path having one or more relay nodes of the set of relay nodes. The communications manager 920 may be configured as or otherwise support a means for selecting a first relay path based on the set of end-to-end metrics. The communications manager 920 may be configured as or otherwise support a means for transmitting an indication of the first relay path to the second node.

Additionally or alternatively, the communications manager 920 may support wireless communication in accordance with examples as disclosed herein. For example, the communications manager 920 may be configured as or otherwise support a means for determining, at a second node, reference signal resources for a set of multiple reference signals to be transmitted between a first node and the second node through a corresponding relay path of a first subset of a set of relay paths, where each relay path of the first subset of relay paths includes a relay node of a set of relay nodes that relay transmissions between the first node and the second node. The communications manager 920 may be configured as or otherwise support a means for transmitting, to the first node, one or more of the set of multiple reference signals via the set of relay nodes, or a set of end-to-end metrics that are based on one more measurements of the set of multiple reference signals that are received at the second node. The communications manager 920 may be configured as or otherwise support a means for receiving, form the first node, an indication of a first relay path of the set of relay paths to be used for relayed communication between the first node and the second node.

By including or configuring the communications manager 920 in accordance with examples as described herein, the device 905 may support techniques for relay path selection that provides enhanced reliability of communications, enhanced data rates of communications, or both, by providing reliable communications paths between wireless nodes based on end-to-end metrics of available relay paths. Additionally, the described techniques provide for improving resource use, power consumption, battery life, latency, and throughput, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of reference-signal-based relay selection in wireless communications as described herein, or the processor 940 and the memory 930 may be otherwise configured to perform or support such operations.

Figure 10:
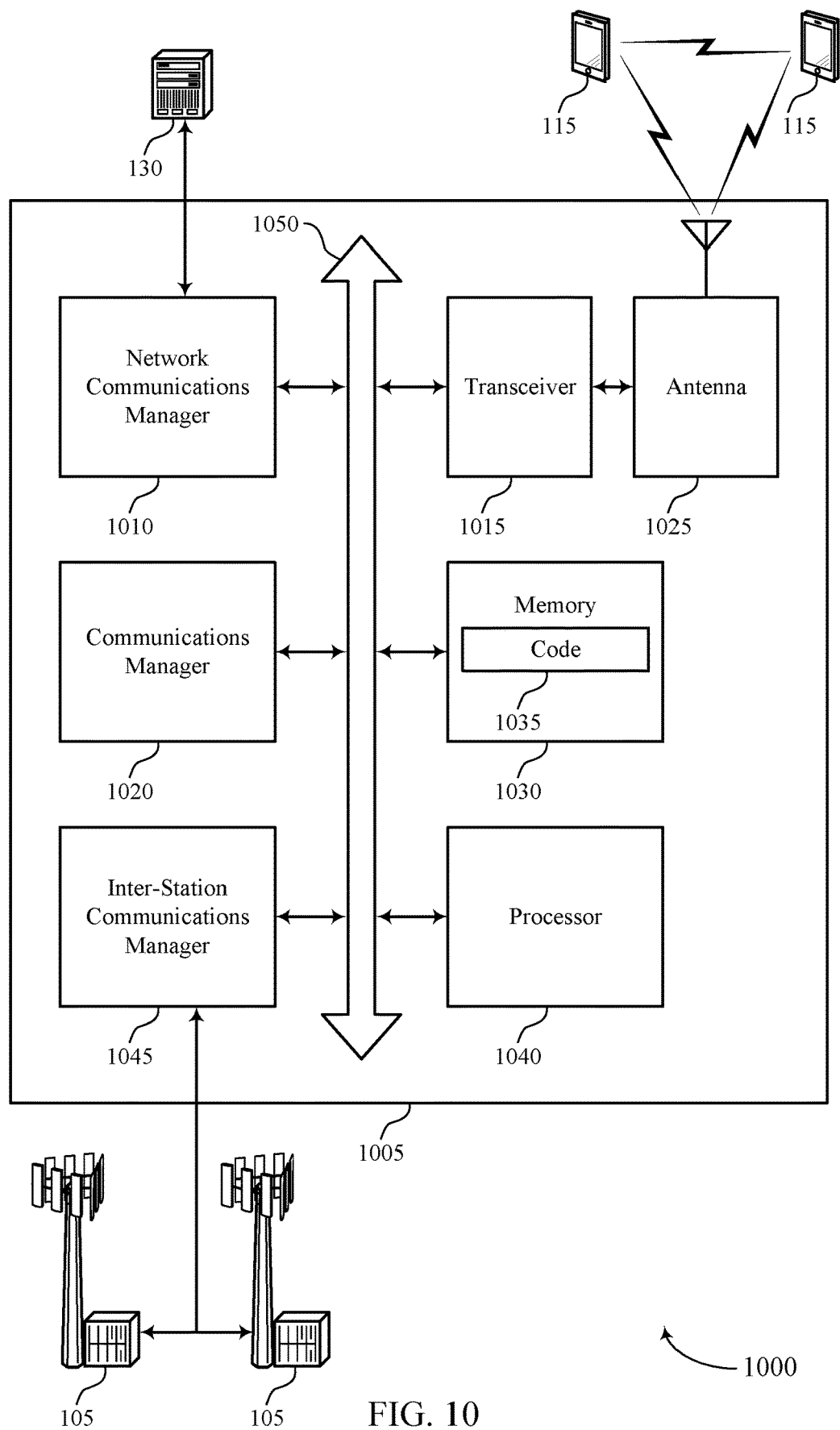
FIG. 10 shows a diagram of a system including a UE that supports reference-signal-based relay selection in wireless communications in accordance with respects of the present disclosure.

FIG. 10 shows a diagram of a system 1000 including a device 1005 that supports reference-signal-based relay selection in wireless communications in accordance with aspects of the present disclosure. The device 1005 may be an example of or include the components of a device 605, a device 705, or a base station 105 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, a network communications manager 1010, a transceiver 1015, an antenna 1025, a memory 1030, code 1035, a processor 1040, and an inter-station communications manager 1045. These components may be in electronic communication or otherwise coupled (e.g., operatively, communicatively, functionally, electronically, electrically) via one or more buses (e.g., a bus 1050).

The network communications manager 1010 may manage communications with a core network 130 (e.g., via one or more wired backhaul links). For example, the network communications manager 1010 may manage the transfer of data communications for client devices, such as one or more UEs 115.

In some cases, the device 1005 may include a single antenna 1025. However, in some other cases the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 615, a transmitter 715, a receiver 610, a receiver 710, or any combination thereof or component thereof, as described herein.

The memory 1030 may include RAM and ROM. The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory.

In some cases, the code 1035 may not be directly executable by the processor 1040 but may cause a computer (e.g., when compiled and executed) to perform functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting reference-signal-based relay selection in wireless communications). For example, the device 1005 or a component of the device 1005 may include a processor 1040 and memory 1030 coupled to the processor 1040, the processor 1040 and memory 1030 configured to perform various functions described herein.

The inter-station communications manager 1045 may manage communications with other base stations 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communications network technology to provide communication between base stations 105.

The communications manager 1020 may support wireless communication at a first node in accordance with examples as disclosed herein. For example, the communications manager 1020 may be configured as or otherwise support a means for determining reference signal resources for a set of multiple reference signals to be transmitted between the first node and a second node through a corresponding relay path of a first subset of a set of relay paths, where each relay path of the first subset of relay paths includes a relay node of a set of relay nodes that relay transmissions between the first node and the second node. The communications manager 1020 may be configured as or otherwise support a means for obtaining measurement information for each of the set of multiple reference signals. The communications manager 1020 may be configured as or otherwise support a means for determining, based on the measurement information, a set of end-to-end metrics for the set of relay paths between the first node and the second node, each relay path having one or more relay nodes of the set of relay nodes. The communications manager 1020 may be configured as or otherwise support a means for selecting a first relay path based on the set of end-to-end metrics. The communications manager 1020 may be configured as or otherwise support a means for transmitting an indication of the first relay path to the second node.

Additionally or alternatively, the communications manager 1020 may support wireless communication in accordance with examples as disclosed herein. For example, the communications manager 1020 may be configured as or otherwise support a means for determining, at a second node, reference signal resources for a set of multiple reference signals to be transmitted between a first node and the second node through a corresponding relay path of a first subset of a set of relay paths, where each relay path of the first subset of relay paths includes a relay node of a set of relay nodes that relay transmissions between the first node and the second node. The communications manager 1020 may be configured as or otherwise support a means for transmitting, to the first node, one or more of the set of multiple reference signals via the set of relay nodes, or a set of end-to-end metrics that are based on one more measurements of the set of multiple reference signals that are received at the second node. The communications manager 1020 may be configured as or otherwise support a means for receiving, form the first node, an indication of a first relay path of the set of relay paths to be used for relayed communication between the first node and the second node.

By including or configuring the communications manager 1020 in accordance with examples as described herein, the device 1005 may support techniques for relay path selection that provides enhanced reliability of communications, enhanced data rates of communications, or both, by providing reliable communications paths between wireless nodes based on end-to-end metrics of available relay paths. Additionally, the described techniques provide for improving resource use, power consumption, battery life, latency, and throughput, among other benefits.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of reference-signal-based relay selection in wireless communications as described herein, or the processor 1040 and the memory 1030 may be otherwise configured to perform or support such operations.

Figure 11:
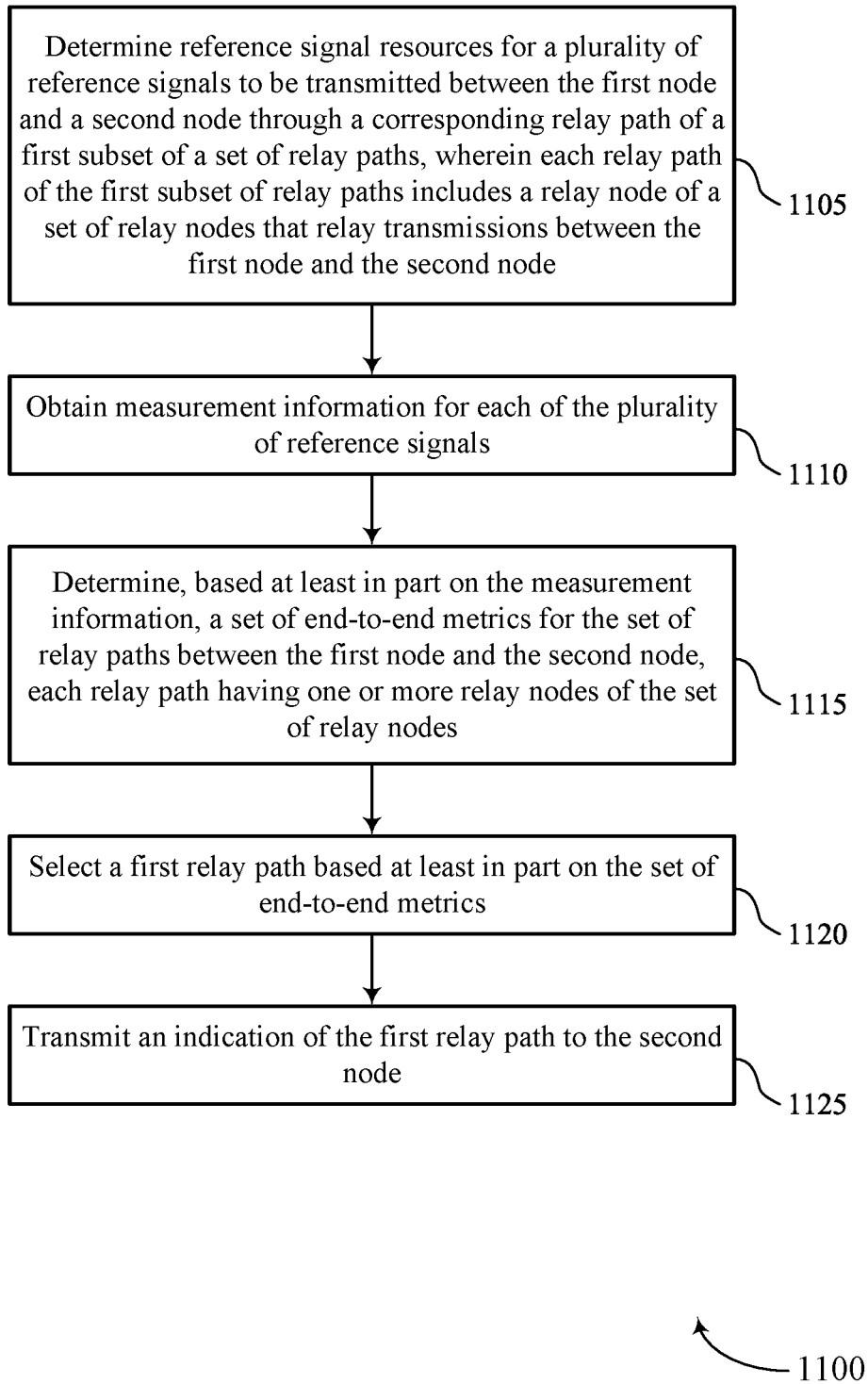
FIGS. 11 through 19 show flowcharts illustrating methods that support reference-signal-based relay selection in wireless communications in accordance with aspects of the present disclosure.

FIG. 11 shows a flowchart illustrating a method 1100 that supports reference-signal-based relay selection in wireless communications in accordance with aspects of the present disclosure. The operations of the method 1100 may be implemented by a UE or a base station or its components as described herein. For example, the operations of the method 1100 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1105, the method may include determining reference signal resources for a set of multiple reference signals to be transmitted between the first node and a second node through a corresponding relay path of a first subset of a set of relay paths, where each relay path of the first subset of relay paths includes a relay node of a set of relay nodes that relay transmissions between the first node and the second node. The operations of 1105 may be performed in accordance with examples as disclosed herein. In some examples, aspects of the operations of 1105 may be performed by a reference signal manager 825 as described with reference to FIG. 8.

At 1110, the method may include obtaining measurement information for each of the set of multiple reference signals. The operations of 1110 may be performed in accordance with examples as disclosed herein. In some examples, aspects of the operations of 1110 may be performed by a measurement manager 830 as described with reference to FIG. 8.

At 1115, the method may include determining, based on the measurement information, a set of end-to-end metrics for the set of relay paths between the first node and the second node, each relay path having one or more relay nodes of the set of relay nodes. The operations of 1115 may be performed in accordance with examples as disclosed herein. In some examples, aspects of the operations of 1115 may be performed by a path metric manager 835 as described with reference to FIG. 8.

At 1120, the method may include selecting a first relay path based on the set of end-to-end metrics. The operations of 1120 may be performed in accordance with examples as disclosed herein. In some examples, aspects of the operations of 1120 may be performed by a path selection manager 840 as described with reference to FIG. 8.

At 1125, the method may include transmitting an indication of the first relay path to the second node. The operations of 1125 may be performed in accordance with examples as disclosed herein. In some examples, aspects of the operations of 1125 may be performed by a path selection manager 840 as described with reference to FIG. 8.

Figure 12:
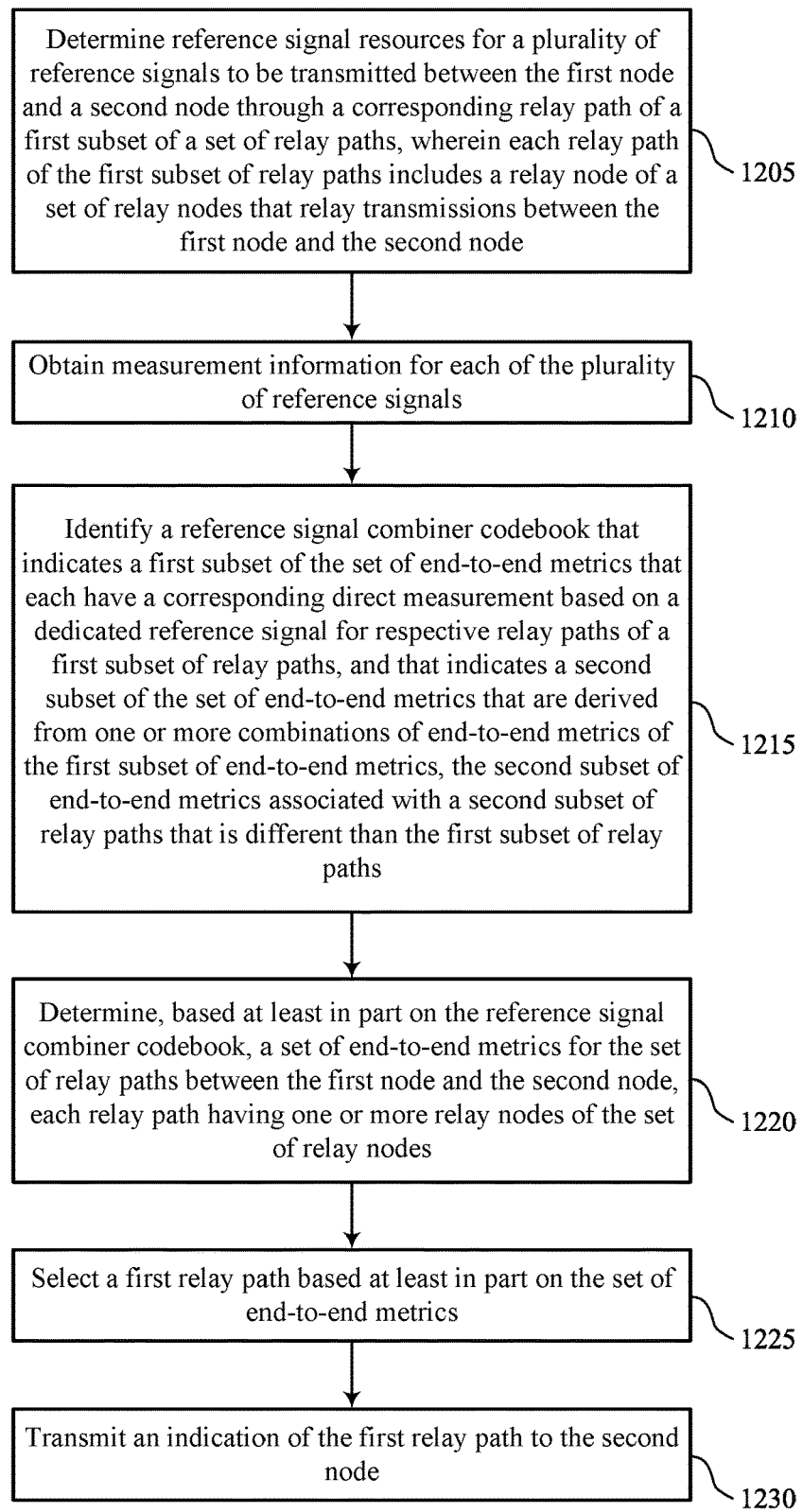

FIG. 12 shows a flowchart illustrating a method 1200 that supports reference-signal-based relay selection in wireless communications in accordance with aspects of the present disclosure. The operations of the method 1200 may be implemented by a UE or a base station or its components as described herein. For example, the operations of the method 1200 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1205, the method may include determining reference signal resources for a set of multiple reference signals to be transmitted between the first node and a second node through a corresponding relay path of a first subset of a set of relay paths, where each relay path of the first subset of relay paths includes a relay node of a set of relay nodes that relay transmissions between the first node and the second node. The operations of 1205 may be performed in accordance with examples as disclosed herein. In some examples, aspects of the operations of 1205 may be performed by a reference signal manager 825 as described with reference to FIG. 8.

At 1210, the method may include obtaining measurement information for each of the set of multiple reference signals. The operations of 1210 may be performed in accordance with examples as disclosed herein. In some examples, aspects of the operations of 1210 may be performed by a measurement manager 830 as described with reference to FIG. 8.

At 1215, the method may include identifying a reference signal combiner codebook that indicates a first subset of the set of end-to-end metrics that each have a corresponding direct measurement based on a dedicated reference signal for respective relay paths of a first subset of relay paths, and that indicates a second subset of the set of end-to-end metrics that are derived from one or more combinations of end-to-end metrics of the first subset of end-to-end metrics, the second subset of end-to-end metrics associated with a second subset of relay paths that is different than the first subset of relay paths. The operations of 1215 may be performed in accordance with examples as disclosed herein. In some examples, aspects of the operations of 1215 may be performed by a combiner codebook manager 845 as described with reference to FIG. 8. In some cases, the set of end-to-end metrics is determined based on the reference signal combiner codebook.

At 1220, the method may include determining, based on the reference signal combiner codebook, a set of end-to-end metrics for the set of relay paths between the first node and the second node, each relay path having one or more relay nodes of the set of relay nodes. The operations of 1220 may be performed in accordance with examples as disclosed herein. In some examples, aspects of the operations of 1220 may be performed by a path metric manager 835 as described with reference to FIG. 8.

At 1225, the method may include selecting a first relay path based on the set of end-to-end metrics. The operations of 1225 may be performed in accordance with examples as disclosed herein. In some examples, aspects of the operations of 1225 may be performed by a path selection manager 840 as described with reference to FIG. 8.

At 1230, the method may include transmitting an indication of the first relay path to the second node. The operations of 1230 may be performed in accordance with examples as disclosed herein. In some examples, aspects of the operations of 1230 may be performed by a path selection manager 840 as described with reference to FIG. 8.

Figure 13:
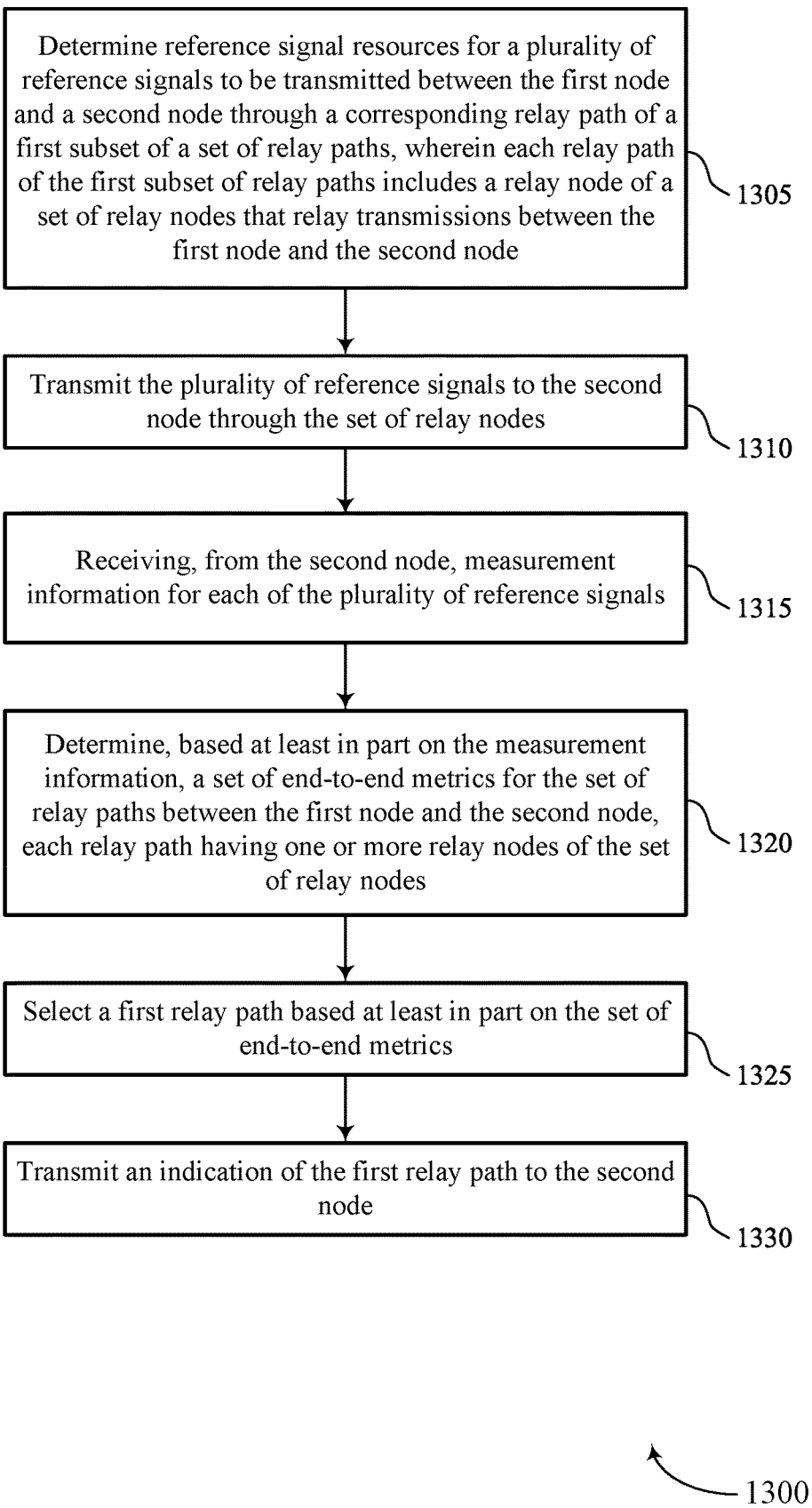

FIG. 13 shows a flowchart illustrating a method 1300 that supports reference-signal-based relay selection in wireless communications in accordance with aspects of the present disclosure. The operations of the method 1300 may be implemented by a UE or a base station or its components as described herein. For example, the operations of the method 1300 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1305, the method may include determining reference signal resources for a set of multiple reference signals to be transmitted between the first node and a second node through a corresponding relay path of a first subset of a set of relay paths, where each relay path of the first subset of relay paths includes a relay node of a set of relay nodes that relay transmissions between the first node and the second node. The operations of 1305 may be performed in accordance with examples as disclosed herein. In some examples, aspects of the operations of 1305 may be performed by a reference signal manager 825 as described with reference to FIG. 8.

At 1310, the method may include transmitting the set of multiple reference signals to the second node through the set of relay nodes. The operations of 1310 may be performed in accordance with examples as disclosed herein. In some examples, aspects of the operations of 1310 may be performed by a reference signal manager 825 as described with reference to FIG. 8.

At 1315, the method may include receiving, from the second node, measurement information for each of the set of multiple reference signals. The operations of 1315 may be performed in accordance with examples as disclosed herein. In some examples, aspects of the operations of 1315 may be performed by a measurement manager 830 as described with reference to FIG. 8.

At 1320, the method may include determining, based on the measurement information, a set of end-to-end metrics for the set of relay paths between the first node and the second node, each relay path having one or more relay nodes of the set of relay nodes. The operations of 1320 may be performed in accordance with examples as disclosed herein. In some examples, aspects of the operations of 1320 may be performed by a path metric manager 835 as described with reference to FIG. 8.

At 1325, the method may include selecting a first relay path based on the set of end-to-end metrics. The operations of 1325 may be performed in accordance with examples as disclosed herein. In some examples, aspects of the operations of 1325 may be performed by a path selection manager 840 as described with reference to FIG. 8.

At 1330, the method may include transmitting an indication of the first relay path to the second node. The operations of 1330 may be performed in accordance with examples as disclosed herein. In some examples, aspects of the operations of 1330 may be performed by a path selection manager 840 as described with reference to FIG. 8.

Figure 14:
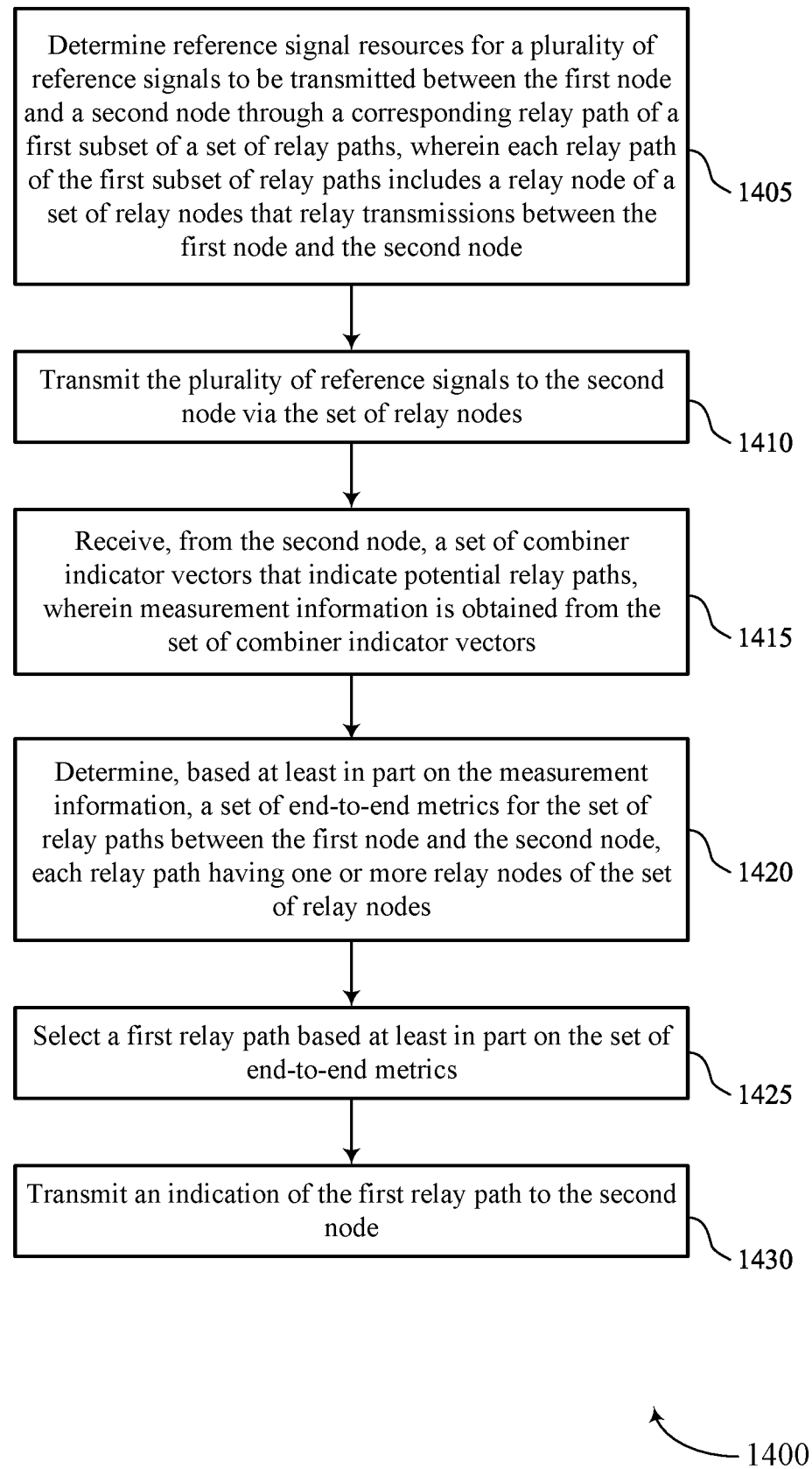

FIG. 14 shows a flowchart illustrating a method 1400 that supports reference-signal-based relay selection in wireless communications in accordance with aspects of the present disclosure. The operations of the method 1400 may be implemented by a UE or a base station or its components as described herein. For example, the operations of the method 1400 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include determining reference signal resources for a set of multiple reference signals to be transmitted between the first node and a second node through a corresponding relay path of a first subset of a set of relay paths, where each relay path of the first subset of relay paths includes a relay node of a set of relay nodes that relay transmissions between the first node and the second node. The operations of 1405 may be performed in accordance with examples as disclosed herein. In some examples, aspects of the operations of 1405 may be performed by a reference signal manager 825 as described with reference to FIG. 8.

At 1410, the method may include transmitting the set of multiple reference signals to the second node via the set of relay nodes. The operations of 1410 may be performed in accordance with examples as disclosed herein. In some examples, aspects of the operations of 1410 may be performed by a reference signal manager 825 as described with reference to FIG. 8.

At 1415, the method may include receiving, from the second node, a set of combiner indicator vectors that indicate potential relay paths, where measurement information is obtained from the set of combiner indicator vectors. The operations of 1415 may be performed in accordance with examples as disclosed herein. In some examples, aspects of the operations of 1415 may be performed by a path metric manager 835 as described with reference to FIG. 8.

At 1420, the method may include determining, based on the measurement information, a set of end-to-end metrics for the set of relay paths between the first node and the second node, each relay path having one or more relay nodes of the set of relay nodes. The operations of 1420 may be performed in accordance with examples as disclosed herein. In some examples, aspects of the operations of 1420 may be performed by a path metric manager 835 as described with reference to FIG. 8.

At 1425, the method may include selecting a first relay path based on the set of end-to-end metrics. The operations of 1425 may be performed in accordance with examples as disclosed herein. In some examples, aspects of the operations of 1425 may be performed by a path selection manager 840 as described with reference to FIG. 8.

At 1430, the method may include transmitting an indication of the first relay path to the second node. The operations of 1430 may be performed in accordance with examples as disclosed herein. In some examples, aspects of the operations of 1430 may be performed by a path selection manager 840 as described with reference to FIG. 8.

Figure 15:
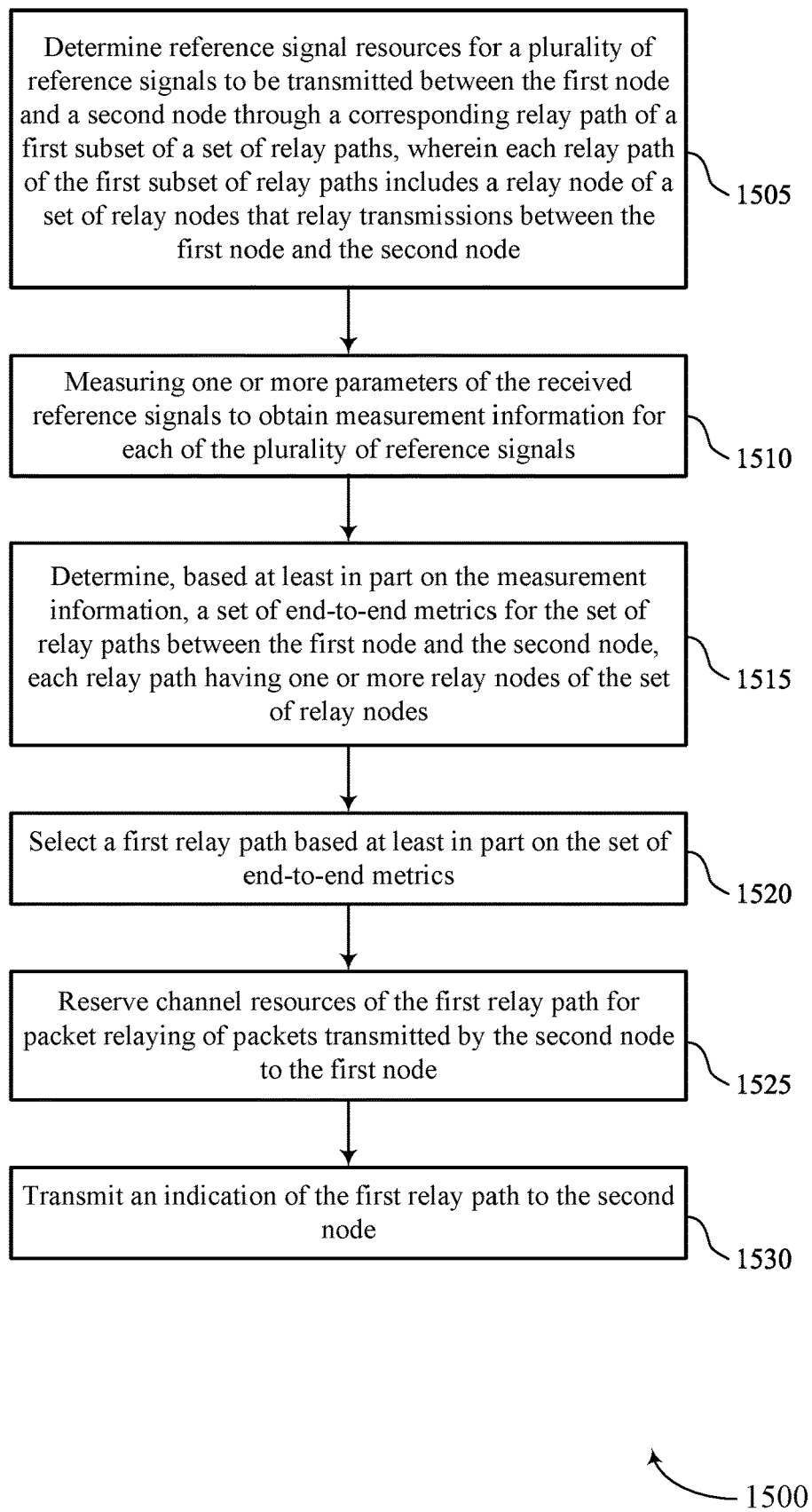

FIG. 15 shows a flowchart illustrating a method 1500 that supports reference-signal-based relay selection in wireless communications in accordance with aspects of the present disclosure. The operations of the method 1500 may be implemented by a UE or a base station or its components as described herein. For example, the operations of the method 1500 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1505, the method may include determining reference signal resources for a set of multiple reference signals to be transmitted between the first node and a second node through a corresponding relay path of a first subset of a set of relay paths, where each relay path of the first subset of relay paths includes a relay node of a set of relay nodes that relay transmissions between the first node and the second node. The operations of 1505 may be performed in accordance with examples as disclosed herein. In some examples, aspects of the operations of 1505 may be performed by a reference signal manager 825 as described with reference to FIG. 8.

At 1510, the method may include measuring one or more parameters of the received reference signals to obtain measurement information for each of the set of multiple reference signals. The operations of 1510 may be performed in accordance with examples as disclosed herein. In some examples, aspects of the operations of 1510 may be performed by a measurement manager 830 as described with reference to FIG. 8.

At 1515, the method may include determining, based on the measurement information, a set of end-to-end metrics for the set of relay paths between the first node and the second node, each relay path having one or more relay nodes of the set of relay nodes. The operations of 1515 may be performed in accordance with examples as disclosed herein. In some examples, aspects of the operations of 1515 may be performed by a path metric manager 835 as described with reference to FIG. 8.

At 1520, the method may include selecting a first relay path based on the set of end-to-end metrics. The operations of 1520 may be performed in accordance with examples as disclosed herein. In some examples, aspects of the operations of 1520 may be performed by a path selection manager 840 as described with reference to FIG. 8.

At 1525, the method may include reserving channel resources of the first relay path for packet relaying of packets transmitted by the second node to the first node. The operations of 1525 may be performed in accordance with examples as disclosed herein. In some examples, aspects of the operations of 1525 may be performed by a relayed communications manager 850 as described with reference to FIG. 8.

At 1530, the method may include transmitting an indication of the first relay path to the second node. The operations of 1530 may be performed in accordance with examples as disclosed herein. In some examples, aspects of the operations of 1530 may be performed by a path selection manager 840 as described with reference to FIG. 8.

Figure 16:
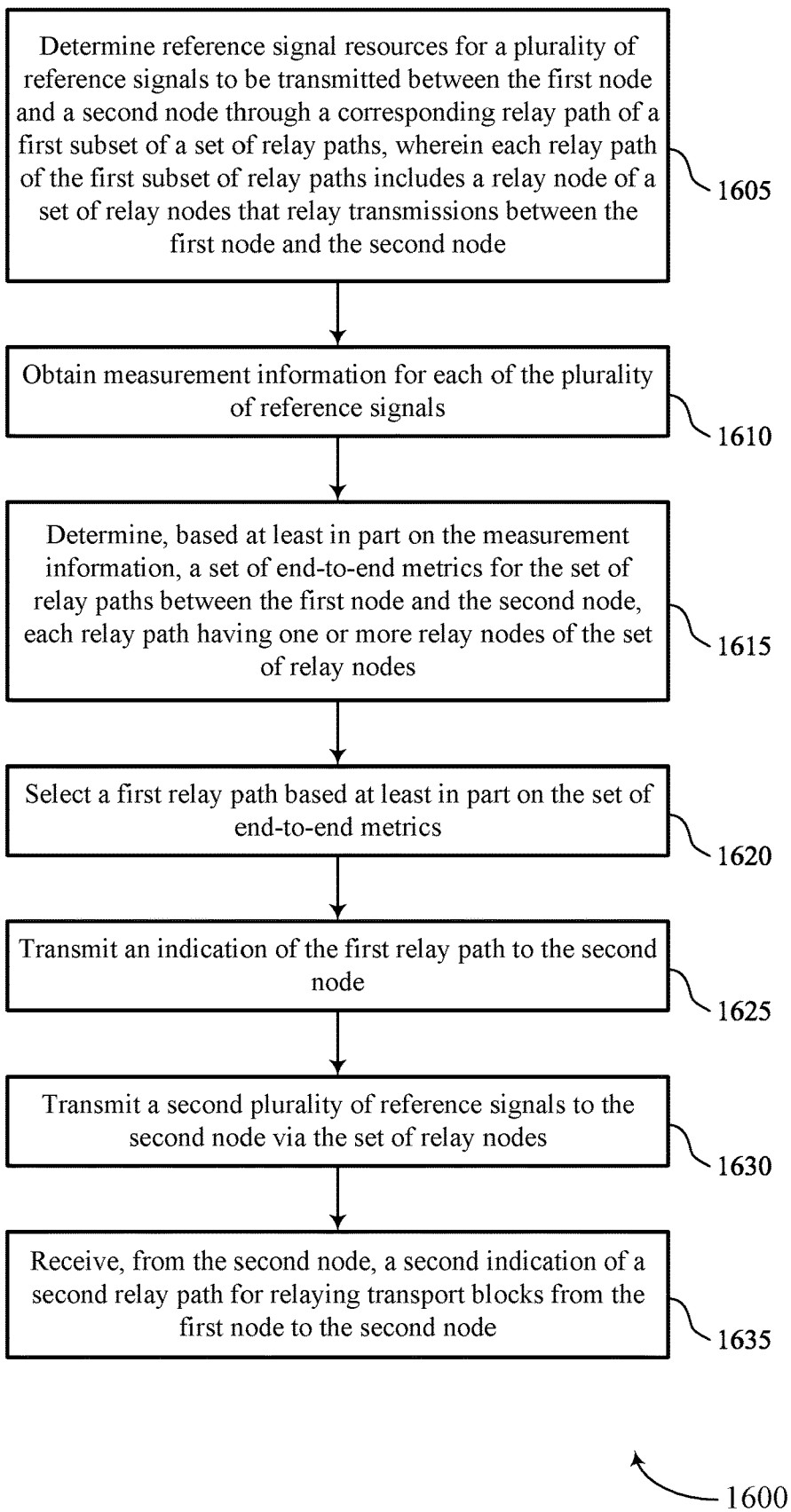

FIG. 16 shows a flowchart illustrating a method 1600 that supports reference-signal-based relay selection in wireless communications in accordance with aspects of the present disclosure. The operations of the method 1600 may be implemented by a UE or a base station or its components as described herein. For example, the operations of the method 1600 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1605, the method may include determining reference signal resources for a set of multiple reference signals to be transmitted between the first node and a second node through a corresponding relay path of a first subset of a set of relay paths, where each relay path of the first subset of relay paths includes a relay node of a set of relay nodes that relay transmissions between the first node and the second node. The operations of 1605 may be performed in accordance with examples as disclosed herein. In some examples, aspects of the operations of 1605 may be performed by a reference signal manager 825 as described with reference to FIG. 8.

At 1610, the method may include obtaining measurement information for each of the set of multiple reference signals. The operations of 1610 may be performed in accordance with examples as disclosed herein. In some examples, aspects of the operations of 1610 may be performed by a measurement manager 830 as described with reference to FIG. 8.

At 1615, the method may include determining, based on the measurement information, a set of end-to-end metrics for the set of relay paths between the first node and the second node, each relay path having one or more relay nodes of the set of relay nodes. The operations of 1615 may be performed in accordance with examples as disclosed herein. In some examples, aspects of the operations of 1615 may be performed by a path metric manager 835 as described with reference to FIG. 8.

At 1620, the method may include selecting a first relay path based on the set of end-to-end metrics. The operations of 1620 may be performed in accordance with examples as disclosed herein. In some examples, aspects of the operations of 1620 may be performed by a path selection manager 840 as described with reference to FIG. 8.

At 1625, the method may include transmitting an indication of the first relay path to the second node. The operations of 1625 may be performed in accordance with examples as disclosed herein. In some examples, aspects of the operations of 1625 may be performed by a path selection manager 840 as described with reference to FIG. 8.

At 1630, the method may include transmitting a second set of multiple reference signals to the second node via the set of relay nodes. The operations of 1630 may be performed in accordance with examples as disclosed herein. In some examples, aspects of the operations of 1630 may be performed by a reference signal manager 825 as described with reference to FIG. 8.

At 1635, the method may include receiving, from the second node, a second indication of a second relay path for relaying transport blocks from the first node to the second node. The operations of 1635 may be performed in accordance with examples as disclosed herein. In some examples, aspects of the operations of 1635 may be performed by a path selection manager 840 as described with reference to FIG. 8.

Figure 17:
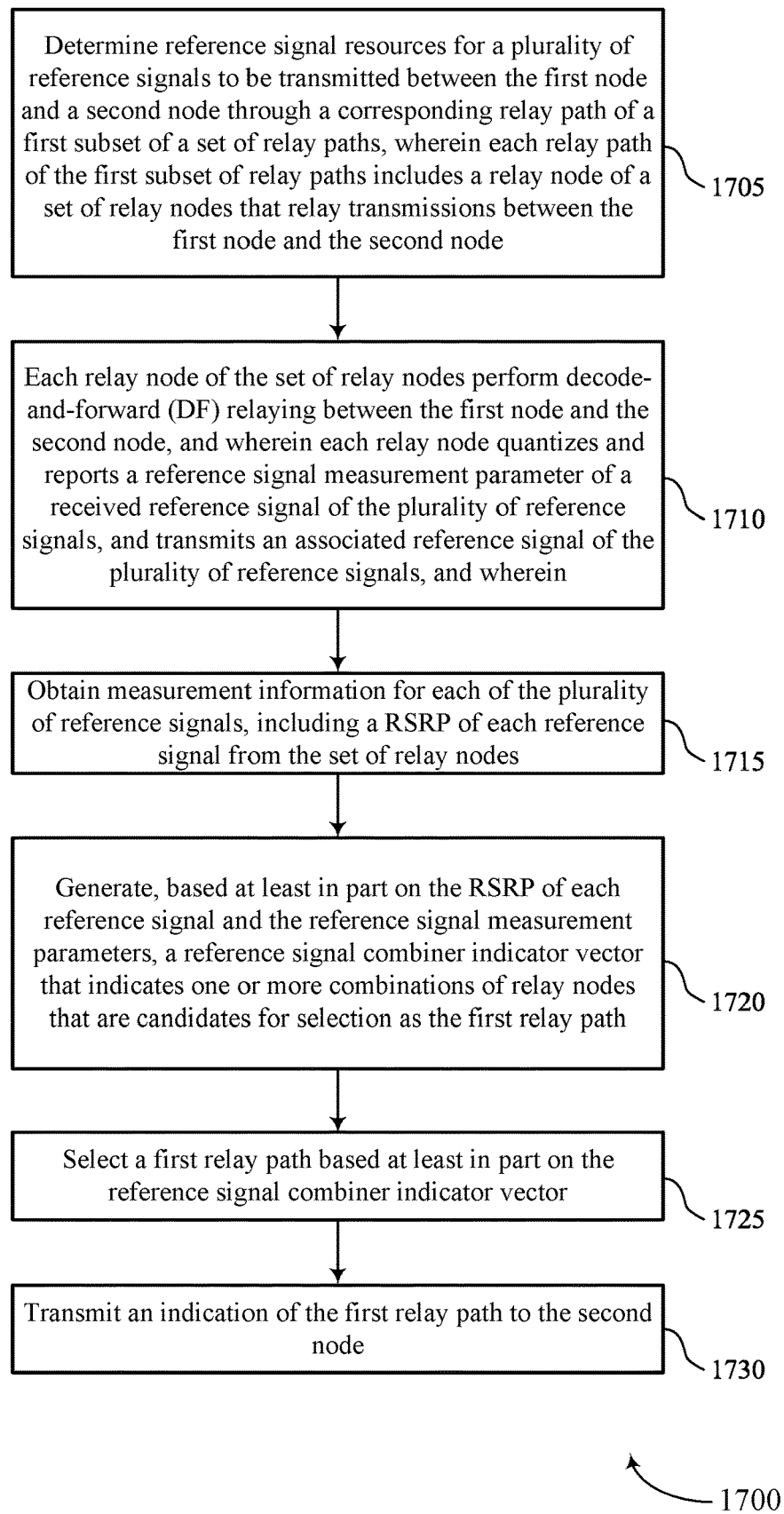

FIG. 17 shows a flowchart illustrating a method 1700 that supports reference-signal-based relay selection in wireless communications in accordance with aspects of the present disclosure. The operations of the method 1700 may be implemented by a UE or a base station or its components as described herein. For example, the operations of the method 1700 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1705, the method may include determining reference signal resources for a set of multiple reference signals to be transmitted between the first node and a second node through a corresponding relay path of a first subset of a set of relay paths, where each relay path of the first subset of relay paths includes a relay node of a set of relay nodes that relay transmissions between the first node and the second node. The operations of 1705 may be performed in accordance with examples as disclosed herein. In some examples, aspects of the operations of 1705 may be performed by a reference signal manager 825 as described with reference to FIG. 8.

At 1710, the method may include each relay node of the set of relay nodes performing decode-and-forward (DF) relaying between the first node and the second node, and where each relay node quantizes and reports a reference signal measurement parameter of a received reference signal of the set of multiple reference signals, and transmits an associated reference signal of the set of multiple reference signals, and where. The operations of 1710 may be performed in accordance with examples as disclosed herein. In some examples, aspects of the operations of 1710 may be performed by a path metric manager 835 as described with reference to FIG. 8.

At 1715, the method may include obtaining measurement information for each of the set of multiple reference signals, including a RSRP of each reference signal from the set of relay nodes. The operations of 1715 may be performed in accordance with examples as disclosed herein. In some examples, aspects of the operations of 1715 may be performed by a measurement manager 830 as described with reference to FIG. 8.

At 1720, the method may include generating, based on the RSRP of each reference signal and the reference signal measurement parameters, a reference signal combiner indicator vector that indicates one or more combinations of relay nodes that are candidates for selection as the first relay path. The operations of 1720 may be performed in accordance with examples as disclosed herein. In some examples, aspects of the operations of 1720 may be performed by a combiner codebook manager 845 as described with reference to FIG. 8. In some cases, the reference signal combiner indicator vector is based on reference signal measurement parameters (e.g., RSRP associated with reference signals of one or more other nodes) from the set of relay nodes and one or more measurements of the reference signals transmitted by the relay nodes.

At 1725, the method may include selecting a first relay path based on the reference signal combiner indicator vector. The operations of 1725 may be performed in accordance with examples as disclosed herein. In some examples, aspects of the operations of 1725 may be performed by a path selection manager 840 as described with reference to FIG. 8.

At 1730, the method may include transmitting an indication of the first relay path to the second node. The operations of 1730 may be performed in accordance with examples as disclosed herein. In some examples, aspects of the operations of 1730 may be performed by a path selection manager 840 as described with reference to FIG. 8.

Figure 18:
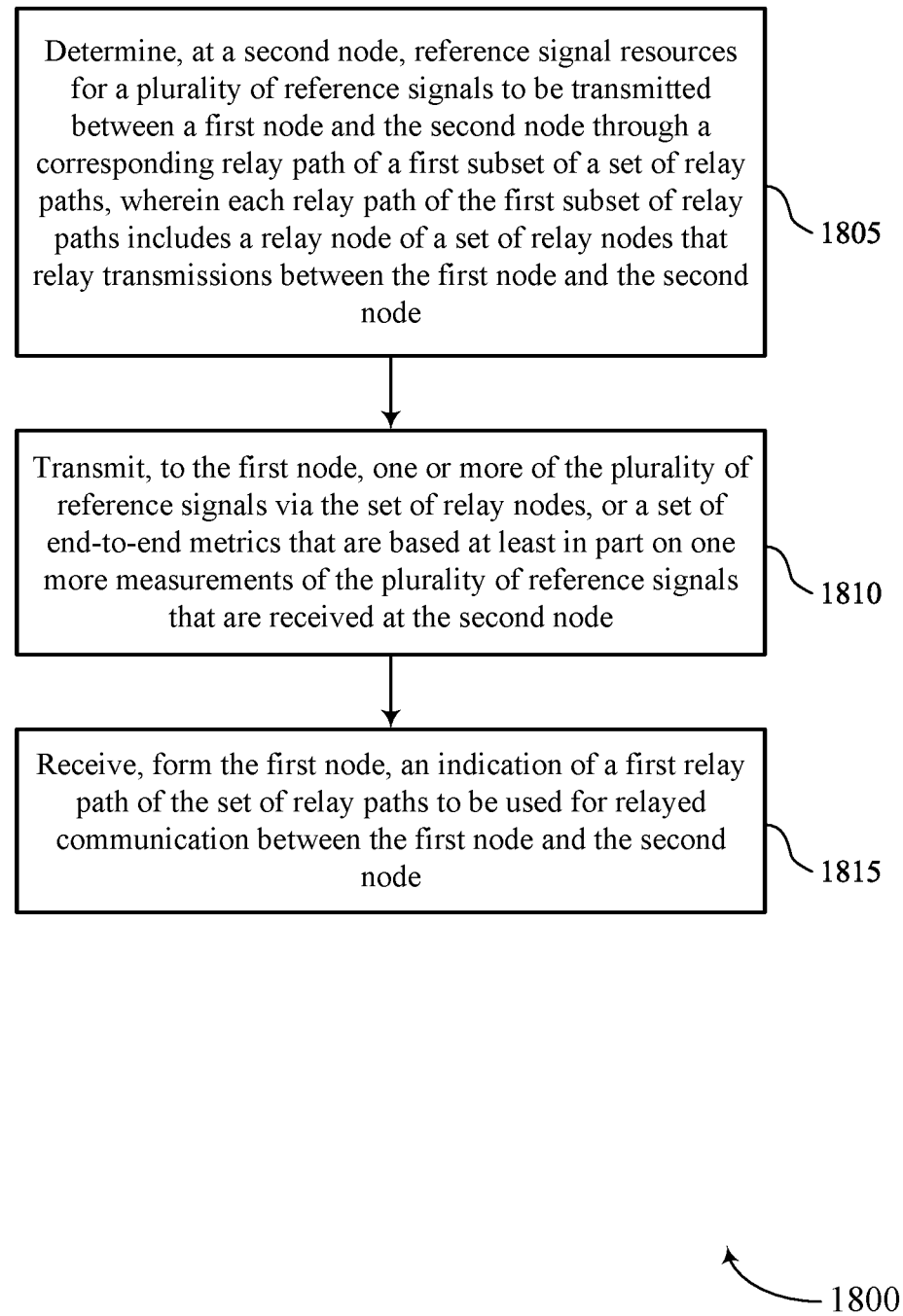

FIG. 18 shows a flowchart illustrating a method 1800 that supports reference-signal-based relay selection in wireless communications in accordance with aspects of the present disclosure. The operations of the method 1800 may be implemented by a UE or a base station or its components as described herein. For example, the operations of the method 1800 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1805, the method may include determining, at a second node, reference signal resources for a set of multiple reference signals to be transmitted between a first node and the second node through a corresponding relay path of a first subset of a set of relay paths, where each relay path of the first subset of relay paths includes a relay node of a set of relay nodes that relay transmissions between the first node and the second node. The operations of 1805 may be performed in accordance with examples as disclosed herein. In some examples, aspects of the operations of 1805 may be performed by a reference signal manager 825 as described with reference to FIG. 8.

At 1810, the method may include transmitting, to the first node, one or more of the set of multiple reference signals via the set of relay nodes, or a set of end-to-end metrics that are based on one more measurements of the set of multiple reference signals that are received at the second node. The operations of 1810 may be performed in accordance with examples as disclosed herein. In some examples, aspects of the operations of 1810 may be performed by a reference signal manager 825 as described with reference to FIG. 8.

At 1815, the method may include receiving, form the first node, an indication of a first relay path of the set of relay paths to be used for relayed communication between the first node and the second node. The operations of 1815 may be performed in accordance with examples as disclosed herein. In some examples, aspects of the operations of 1815 may be performed by a path selection manager 840 as described with reference to FIG. 8.

Figure 19:
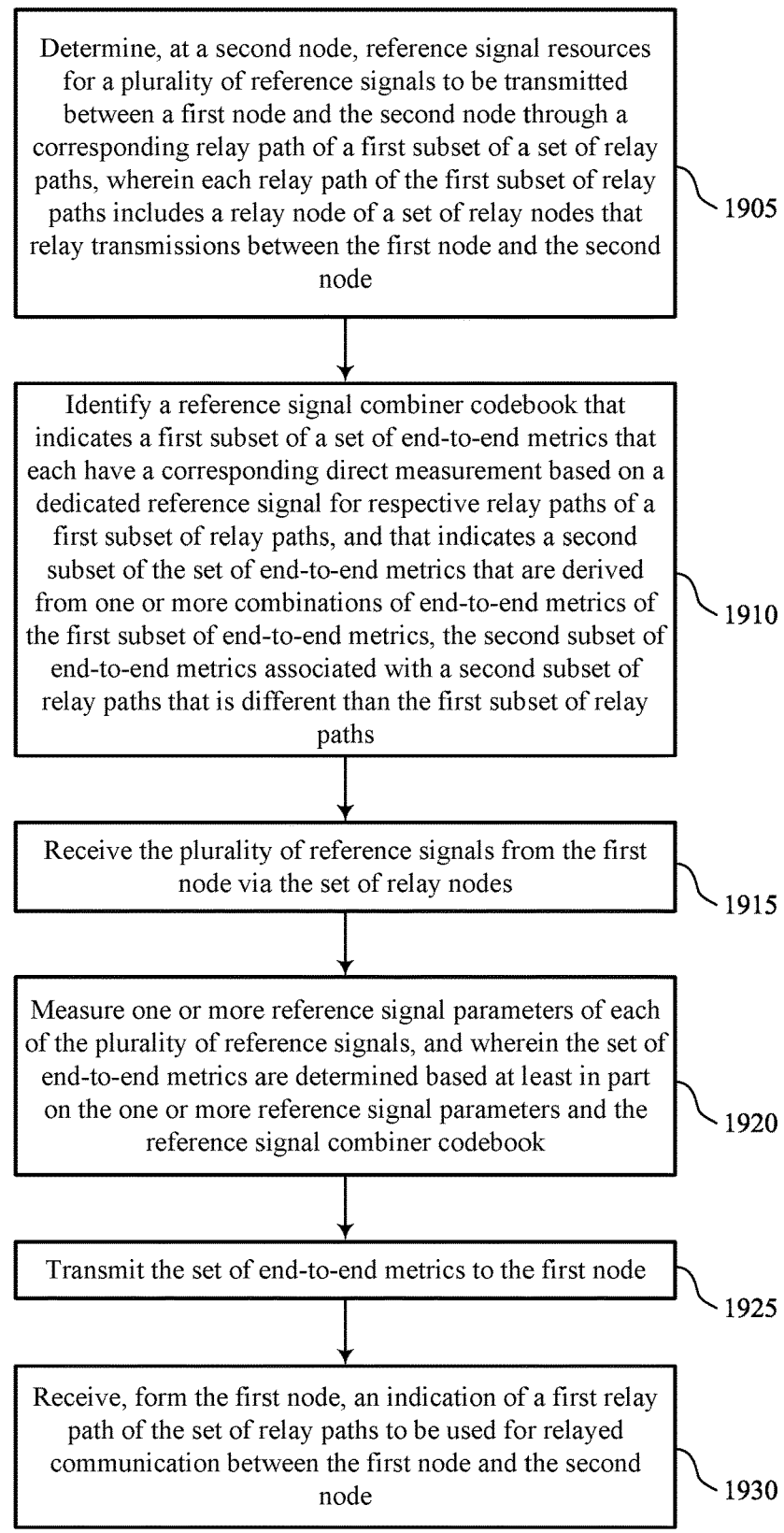

FIG. 19 shows a flowchart illustrating a method 1900 that supports reference-signal-based relay selection in wireless communications in accordance with aspects of the present disclosure. The operations of the method 1900 may be implemented by a UE or a base station or its components as described herein. For example, the operations of the method 1900 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1905, the method may include determining, at a second node, reference signal resources for a set of multiple reference signals to be transmitted between a first node and the second node through a corresponding relay path of a first subset of a set of relay paths, where each relay path of the first subset of relay paths includes a relay node of a set of relay nodes that relay transmissions between the first node and the second node. The operations of 1905 may be performed in accordance with examples as disclosed herein. In some examples, aspects of the operations of 1905 may be performed by a reference signal manager 825 as described with reference to FIG. 8.

At 1910, the method may include identifying a reference signal combiner codebook that indicates a first subset of a set of end-to-end metrics that each have a corresponding direct measurement based on a dedicated reference signal for respective relay paths of a first subset of relay paths, and that indicates a second subset of the set of end-to-end metrics that are derived from one or more combinations of end-to-end metrics of the first subset of end-to-end metrics, the second subset of end-to-end metrics associated with a second subset of relay paths that is different than the first subset of relay paths. The operations of 1910 may be performed in accordance with examples as disclosed herein. In some examples, aspects of the operations of 1910 may be performed by a combiner codebook manager 845 as described with reference to FIG. 8.

At 1915, the method may include receiving the set of multiple reference signals from the first node via the set of relay nodes. The operations of 1915 may be performed in accordance with examples as disclosed herein. In some examples, aspects of the operations of 1915 may be performed by a measurement manager 830 as described with reference to FIG. 8.

At 1920, the method may include measuring one or more reference signal parameters of each of the set of multiple reference signals, and where the set of end-to-end metrics are determined based on the one or more reference signal parameters and the reference signal combiner codebook. The operations of 1920 may be performed in accordance with examples as disclosed herein. In some examples, aspects of the operations of 1920 may be performed by a measurement manager 830 as described with reference to FIG. 8.

At 1925, the method may include transmitting the set of end-to-end metrics to the first node. The operations of 1925 may be performed in accordance with examples as disclosed herein. In some examples, aspects of the operations of 1925 may be performed by a reference signal manager 825 as described with reference to FIG. 8.

At 1930, the method may include receiving, form the first node, an indication of a first relay path of the set of relay paths to be used for relayed communication between the first node and the second node. The operations of 1930 may be performed in accordance with examples as disclosed herein. In some examples, aspects of the operations of 1930 may be performed by a path selection manager 840 as described with reference to FIG. 8.

The following provides an overview of aspects of the present disclosure:

Aspect 1: A method for wireless communication at a first node, comprising: determining reference signal resources for a plurality of reference signals to be transmitted between the first node and a second node through a corresponding relay path of a first subset of a set of relay paths, wherein each relay path of the first subset of relay paths includes a relay node of a set of relay nodes that relay transmissions between the first node and the second node; obtaining measurement information for each of the plurality of reference signals; determining, based at least in part on the measurement information, a set of end-to-end metrics for the set of relay paths between the first node and the second node, each relay path having one or more relay nodes of the set of relay nodes; selecting a first relay path based at least in part on the set of end-to-end metrics; and transmitting an indication of the first relay path to the second node.

Aspect 2: The method of aspect 1, wherein the reference signal resources include resources for one reference signal transmission for each relay node of the set of relay nodes.

Aspect 3: The method of any of aspects 1 through 2, further comprising: identifying a reference signal combiner codebook that indicates a first subset of the set of end-to-end metrics that each have a corresponding direct measurement based on a dedicated reference signal for respective relay paths of a first subset of relay paths, and that indicates a second subset of the set of end-to-end metrics that are derived from one or more combinations of end-to-end metrics of the first subset of end-to-end metrics, the second subset of end-to-end metrics associated with a second subset of relay paths that is different than the first subset of relay paths, and wherein the set of end-to-end metrics is determined based at least in part on the reference signal combiner codebook.

Aspect 4: The method of any of aspects 1 through 3, further comprising: transmitting the plurality of reference signals to the second node through the set of relay nodes; and wherein the obtaining the measurement information includes receiving, from the second node, the measurement information for each of the plurality of reference signals.

Aspect 5: The method of any of aspects 1 through 3, wherein the plurality of reference signals are transmitted by the second node, and wherein the obtaining the measurement information comprises: measuring each reference signal of the plurality of reference signals.

Aspect 6: The method of any of aspects 1 through 5, wherein the first node is a source node that transmits information to the second node via one or more relay nodes of the set of relay nodes using the first relay path, or the first node is a destination node that receives information from the second node via one or more relay nodes of the set of relay nodes using the first relay path.

Aspect 7: The method of any of aspects 1 through 6, wherein each relay node of the set of relay nodes performs AF relaying between the first node and the second node, and wherein the transmitted reference signal is AF relayed by each relay node.

Aspect 8: The method of any of aspects 1 through 7, further comprising: transmitting the plurality of reference signals to the second node via the set of relay nodes; and receiving, from the second node, a set of combiner indicator vectors that indicate potential relay paths, wherein the measurement information is obtained from the set of combiner indicator vectors.

Aspect 9: The method of aspect 8, wherein the set of combiner indicator vectors indicates one or more end-to-end metrics for candidate relay paths of the set of relay paths having associated end-to-end metrics that support forwarding of TBs from the first node to the second node.

Aspect 10: The method of any of aspects 1 through 3, further comprising: receiving the plurality of reference signals from the second node via the set of relay nodes, and wherein the obtaining the measurement information comprises measuring one or more parameters of the received reference signals; and reserving channel resources of the first relay path for packet relaying of packets transmitted by the second node to the first node.

Aspect 11: The method of any of aspects 1 through 10, further comprising: transmitting a second plurality of reference signals to the second node via the set of relay nodes; and receiving, from the second node, a second indication of a second relay path for relaying transport blocks from the first node to the second node.

Aspect 12: The method of any of aspects 1 through 11, wherein each relay node of the set of relay nodes performs analog AF relaying between the first node and the second node, and wherein the transmitted reference signals that are relayed include an identification of a source of the corresponding reference signal.

Aspect 13: The method of any of aspects 1 through 6, wherein each relay node of the set of relay nodes performs analog AF relaying between the first node and the second node, and wherein a source of each reference signal is identified based at least in part on wireless resources used to transmit the reference signal, a starting time of the reference signal, or any combinations thereof.

Aspect 14: The method of any of aspects 1 through 6, wherein each relay node of the set of relay nodes performs DF relaying between the first node and the second node, and wherein each relay node quantizes and reports a reference signal measurement parameter of a received reference signal of the plurality of reference signals, and transmits an associated reference signal of the plurality of reference signals, and wherein the determining is based at least in part on the reference signal measurement parameters from the set of relay nodes and one or more measurements of the reference signals transmitted by the relay nodes.

Aspect 15: The method of aspect 14, further comprising: the obtaining comprises computing a channel metric of each reference signal from the set of relay nodes, and wherein the method further comprises: generating, based at least in part on the channel metric of each reference signal and the reference signal measurement parameters, a reference signal combiner indicator vector that indicates one or more combinations of relay nodes that are candidates for selection as the first relay path.

Aspect 16: A method for wireless communication, comprising: determining, at a second node, reference signal resources for a plurality of reference signals to be transmitted between a first node and the second node through a corresponding relay path of a first subset of a set of relay paths, wherein each relay path of the first subset of relay paths includes a relay node of a set of relay nodes that relay transmissions between the first node and the second node; transmitting, to the first node, one or more of the plurality of reference signals via the set of relay nodes, or a set of end-to-end metrics that are based at least in part on one more measurements of the plurality of reference signals that are received at the second node; and receiving, form the first node, an indication of a first relay path of the set of relay paths to be used for relayed communication between the first node and the second node.

Aspect 17: The method of aspect 16, wherein the reference signal resources include resources for one reference signal transmission for each relay node of the set of relay nodes.

Aspect 18: The method of any of aspects 16 through 17, further comprising: identifying a reference signal combiner codebook that indicates a first subset of the set of end-to-end metrics that each have a corresponding direct measurement based on a dedicated reference signal for respective relay paths of a first subset of relay paths, and that indicates a second subset of the set of end-to-end metrics that are derived from one or more combinations of end-to-end metrics of the first subset of end-to-end metrics, the second subset of end-to-end metrics associated with a second subset of relay paths that is different than the first subset of relay paths, and wherein the set of end-to-end metrics is determined based at least in part on the reference signal combiner codebook.

Aspect 19: The method of aspect 18, further comprising: receiving the plurality of reference signals from the first node via the set of relay nodes; and measuring one or more reference signal parameters of each of the plurality of reference signals, and wherein the set of end-to-end metrics are determined based at least in part on the one or more reference signal parameters.

Aspect 20: The method of any of aspects 16 through 18, wherein the plurality of reference signals are transmitted by the second node, and wherein the method further comprises: receiving, from the first node, a set of reference signal combiner indicator vectors that indicate one or more end-to-end metrics for candidate relay paths of the set of relay paths having associated end-to-end metrics that support forwarding of transport blocks (TBs) from the first node to the second node.

Aspect 21: The method of any of aspects 16 through 20, wherein each relay node of the set of relay nodes performs AF relaying between the first node and the second node, and wherein the transmitted reference signals are AF relayed by each relay node.

Aspect 22: The method of any of aspects 16 through 20, wherein each relay node of the set of relay nodes performs DF relaying between the first node and the second node, and wherein each relay node quantizes and reports a reference signal measurement parameter of a received reference signal of the plurality of reference signals, and transmits an associated reference signal of the plurality of reference signals, and wherein the set of end-to-end channel metrics are determined based at least in part on the reference signal measurement parameters from the set of relay nodes and one or more measurements of the reference signals transmitted by the relay nodes.

Aspect 23: An apparatus for wireless communication at a first node, comprising a processor; memory coupled with the processor; and instructions stored in the memory and executable by the processor to cause the apparatus to perform a method of any of aspects 1 through 15.

Aspect 24: An apparatus for wireless communication at a first node, comprising at least one means for performing a method of any of aspects 1 through 15.

Aspect 25: A non-transitory computer-readable medium storing code for wireless communication at a first node, the code comprising instructions executable by a processor to perform a method of any of aspects 1 through 15.

Aspect 26: An apparatus for wireless communication, comprising a processor; memory coupled with the processor; and instructions stored in the memory and executable by the processor to cause the apparatus to perform a method of any of aspects 16 through 22.

Aspect 27: An apparatus for wireless communication, comprising at least one means for performing a method of any of aspects 16 through 22.

Aspect 28: A non-transitory computer-readable medium storing code for wireless communication, the code comprising instructions executable by a processor to perform a method of any of aspects 16 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first node, comprising:
   at least one memory; and
   at least one processor coupled to the at least one memory, wherein the at least one processor is configured to:
      determine, at the first node, reference signal resources for a plurality of reference signals to be transmitted between the first node and a second node through a corresponding relay path of a first subset of a set of relay paths, wherein each relay path of the first subset of relay paths corresponds to a respective relay node of a plurality of relay nodes that relay transmissions between the first node and the second node;
      obtain, at the first node, measurement information for each of the plurality of reference signals;
      determine, at the first node, based at least in part on the measurement information, a set of end-to-end metrics for the set of relay paths between the first node and the second node, each relay path having one or more relay nodes of the plurality of relay nodes;
      select, at the first node, a first relay path based at least in part on the set of end-to-end metrics; and
      transmit, at the first node, an indication of the first relay path to the second node.

2. The apparatus of claim 1, wherein the reference signal resources include resources for one reference signal transmission for each relay node of the plurality of relay nodes.

3. The apparatus of claim 1, wherein the at least one processor is further configured to:
   identify a reference signal combiner codebook that indicates a first subset of the set of end-to-end metrics that each have a corresponding direct measurement based on a dedicated reference signal for respective relay paths of a first subset of relay paths, and that indicates a second subset of the set of end-to-end metrics that are derived from one or more combinations of end-to-end metrics of the first subset of end-to-end metrics, wherein the second subset of end-to-end metrics is associated with a second subset of relay paths that is different than the first subset of relay paths, and wherein the set of end-to-end metrics is determined based at least in part on the reference signal combiner codebook.

4. The apparatus of claim 1, wherein the at least one processor is further configured:
   transmit the plurality of reference signals to the second node through the plurality of relay nodes; and
   wherein, to obtain the measurement information, the at least one processor is configured to receive, from the second node, the measurement information for each of the plurality of reference signals.

5. The apparatus of claim 1, wherein the plurality of reference signals are transmitted by the second node, and wherein, to obtain the measurement information the at least one processor is configured to:
   measure each reference signal of the plurality of reference signals.

6. The apparatus of claim 1, wherein the first node is a source node that transmits information to the second node via one or more relay nodes of the plurality of relay nodes using the first relay path, or the first node is a destination node that receives information from the second node via one or more relay nodes of the plurality of relay nodes using the first relay path.

7. The apparatus of claim 1, wherein each relay node of the plurality of relay nodes performs amplify-and-forward (AF) relaying between the first node and the second node, and wherein the transmitted reference signal is AF relayed by each relay node.

8. The apparatus of claim 1, wherein the at least one processor is further configured:
   transmit the plurality of reference signals to the second node via the plurality of relay nodes; and
   receive, from the second node, a set of combiner indicator vectors that indicate potential relay paths, wherein the measurement information is obtained from the set of combiner indicator vectors.

9. The apparatus of claim 8, wherein the set of combiner indicator vectors indicates one or more end-to-end metrics for candidate relay paths of the set of relay paths having associated end-to-end metrics that support forwarding of transport blocks (TBs) from the first node to the second node.

10. The apparatus of claim 1, wherein the at least one processor is further configured to:
    receive the plurality of reference signals from the second node via the plurality of relay nodes, and wherein, to obtain the measurement information, the at least one processor is configured to measure one or more parameters of the plurality of reference signals; and
    reserve channel resources of the first relay path for packet relaying of packets transmitted by the second node to the first node.

11. The apparatus of claim 1, wherein the at least one processor is further configured to:
    transmit a second plurality of reference signals to the second node via the plurality of relay nodes; and
    receive, from the second node, a second indication of a second relay path for relaying transport blocks from the first node to the second node.

12. The apparatus of claim 1, wherein each relay node of the plurality of relay nodes performs analog amplify-and-forward (AF) relaying between the first node and the second node, and wherein the transmitted reference signals that are relayed include an identification of a source of a corresponding reference signal.

13. The apparatus of claim 1, wherein each relay node of the plurality of relay nodes performs analog amplify-and-forward (AF) relaying between the first node and the second node, and wherein a source of each reference signal is identified based at least in part on wireless resources used to transmit the reference signal, a starting time of the reference signal, or any combinations thereof.

14. The apparatus of claim 1, wherein:
each relay node of the plurality of relay nodes performs decode-and-forward (DF) relaying between the first node and the second node, and wherein each relay node quantizes and reports a reference signal measurement parameter of a received reference signal of the plurality of reference signals, and transmits an associated reference signal of the plurality of reference signals, and wherein
the determination of the set of end-to-end metrics is based at least in part on the reference signal measurement parameters from the plurality of relay nodes and one or more measurements of reference signals transmitted by the relay nodes.

15. The apparatus of claim 14, wherein to obtain the measurement information for each of the plurality of reference signals, the at least one processor is configured to compute a channel metric of each reference signal from the plurality of relay nodes, and wherein the at least one processor is further configured to:
generate, based at least in part on the channel metric of each reference signal and the reference signal measurement parameters, a reference signal combiner indicator vector that indicates one or more combinations of relay nodes that are candidates for selection as the first relay path.

16. An apparatus for wireless communication, comprising:
at least one memory; and
at least one processor coupled to the at least one memory, wherein the at least one processor is configured to:
determine, at a second node, reference signal resources for a plurality of reference signals to be transmitted between a first node and the second node through a corresponding relay path of a first subset of a set of relay paths, wherein each relay path of the first subset of relay paths includes a relay node of a set of relay nodes that relay transmissions between the first node and the second node;
transmit, to the first node, one or more of the plurality of reference signals via the set of relay nodes, or a set of end-to-end metrics that are based at least in part on one more measurements of the plurality of reference signals that are received at the second node;
identify a reference signal combiner codebook that indicates a first subset of the set of end-to-end metrics that each have a corresponding direct measurement based on a dedicated reference signal for respective relay paths of a first subset of relay paths, wherein the set of end-to-end metrics is determined based at least in part on the reference signal combiner codebook; and
receive, from the first node, an indication of a first relay path of the set of relay paths to be used for relayed communication between the first node and the second node.

17. The apparatus of claim 16, wherein the reference signal resources include resources for one reference signal transmission for each relay node of the set of relay nodes.

18. The apparatus of claim 16, wherein:
the reference signal combiner codebook indicates a second subset of the set of end-to-end metrics that are derived from one or more combinations of end-to-end metrics of the first subset of end-to-end metrics, the second subset of end-to-end metrics associated with a second subset of relay paths that is different than the first subset of relay paths.

19. The apparatus of claim 18, wherein the at least one processor is further configured to:
receive the plurality of reference signals from the first node via the set of relay nodes; and
measure one or more reference signal parameters of each of the plurality of reference signals, and wherein the set of end-to-end metrics are determined based at least in part on the one or more reference signal parameters.

20. The apparatus of claim 16, wherein the plurality of reference signals are transmitted by the second node, and wherein the at least one processor is further configured to:
receive, from the first node, a set of reference signal combiner indicator vectors that indicate one or more end-to-end metrics for candidate relay paths of the set of relay paths having associated end-to-end metrics that support forwarding of transport blocks (TBs) from the first node to the second node.

21. The apparatus of claim 16, wherein each relay node of the set of relay nodes performs amplify-and-forward (AF) relaying between the first node and the second node, and wherein the transmitted reference signals are AF relayed by each relay node.

22. The apparatus of claim 16, wherein:
each relay node of the set of relay nodes performs decode-and-forward (DF) relaying between the first node and the second node, and wherein each relay node quantizes and reports a reference signal measurement parameter of a received reference signal of the plurality of reference signals, and transmits an associated reference signal of the plurality of reference signals, and wherein
the set of end-to-end metrics are determined based at least in part on the reference signal measurement parameters from the set of relay nodes and one or more measurements of reference signals transmitted by the relay nodes.

23. A method for wireless communication at a first node, comprising:
determining, at the first node, reference signal resources for a plurality of reference signals to be transmitted between the first node and a second node through a corresponding relay path of a first subset of a set of relay paths, wherein each relay path of the first subset of relay paths includes a relay node of a plurality of relay nodes that relay transmissions between the first node and the second node;
obtaining, at the first node, measurement information for each of the plurality of reference signals;
determining, at the first node, based at least in part on the measurement information, a set of end-to-end metrics for the set of relay paths between the first node and the second node, each relay path having one or more relay nodes of the plurality of relay nodes;
selecting, at the first node, a first relay path based at least in part on the set of end-to-end metrics; and
transmitting, at the first node, an indication of the first relay path to the second node.

24. The method of claim 23, wherein the reference signal resources include resources for one reference signal transmission for each relay node of the plurality of relay nodes.

25. The method of claim 23, further comprising:
identifying a reference signal combiner codebook that indicates a first subset of the set of end-to-end metrics that each have a corresponding direct measurement based on a dedicated reference signal for respective relay paths of a first subset of relay paths, and that indicates a second subset of the set of end-to-end metrics that are derived from one or more combinations of end-to-end metrics of the first subset of end-to-end metrics, the second subset of end-to-end metrics associated with a second subset of relay paths that is different than the first subset of relay paths, and
wherein the set of end-to-end metrics be determined based at least in part on the reference signal combiner codebook.

26. The method of claim 23, further comprising:
transmitting the plurality of reference signals to the second node through the plurality of relay nodes; and
wherein the obtaining the measurement information includes receiving, from the second node, the measurement information for each of the plurality of reference signals.

27. A method for wireless communication, comprising:
determining, at a second node, reference signal resources for a plurality of reference signals to be transmitted between a first node and the second node through a corresponding relay path of a first subset of a set of relay paths, wherein each relay path of the first subset of relay paths includes a relay node of a set of relay nodes that relay transmissions between the first node and the second node;
transmitting, to the first node, one or more of the plurality of reference signals via the set of relay nodes, or a set of end-to-end metrics that are based at least in part on one more measurements of the plurality of reference signals that are received at the second node;
identifying a reference signal combiner codebook that indicates a first subset of the set of end-to-end metrics that each have a corresponding direct measurement based on a dedicated reference signal for respective relay paths of a first subset of relay paths, wherein the set of end-to-end metrics is determined based at least in part on the reference signal combiner codebook; and
receiving, from the first node, an indication of a first relay path of the set of relay paths to be used for relayed communication between the first node and the second node.

28. The method of claim 27, wherein the reference signal resources include resources for one reference signal transmission for each relay node of the set of relay nodes.

29. The method of claim 27, wherein:
the reference signal combiner codebook indicates a second subset of the set of end-to-end metrics that are derived from one or more combinations of end-to-end metrics of the first subset of end-to-end metrics, the second subset of end-to-end metrics associated with a second subset of relay paths that is different than the first subset of relay paths.

30. The method of claim 29, further comprising:
receiving the plurality of reference signals from the first node via the set of relay nodes; and
measuring one or more reference signal parameters of each of the plurality of reference signals, and wherein the set of end-to-end metrics are determined based at least in part on the one or more reference signal parameters.

\* \* \* \* \*